United States Patent [19]

Yamada

[11] Patent Number: 4,920,502

[45] Date of Patent: Apr. 24, 1990

[54] IMAGE PROCESSING APPARATUS WHICH SELECTABLY OUTPUTS IMAGE INFORMATION

[75] Inventor: Masanori Yamada, Kawasaki, Japan

[73] Assignee: Canon Kabushiki Kaisha, Tokyo, Japan

[21] Appl. No.: 166,801

[22] Filed: Mar. 3, 1988

Related U.S. Application Data

[63] Continuation of Ser. No. 93,083, Aug. 31, 1987, abandoned, which is a continuation of Ser. No. 673,410, Nov. 20, 1984, abandoned.

[30] Foreign Application Priority Data

| Nov. 25, 1983 | [JP] | Japan | 58-222837 |
| Nov. 25, 1983 | [JP] | Japan | 58-222617 |
| Nov. 25, 1983 | [JP] | Japan | 58-222618 |

[51] Int. Cl.$^5$ .............................................. G06F 15/62
[52] U.S. Cl. ...................................... 364/518; 355/218; 358/451; 364/523; 382/16
[58] Field of Search ............... 358/300, 287, 256, 257; 355/3 R, 7, 40, 14 E, 14 R, 15, 202, 218, 200; 382/16, 22, 47, 48; 364/518–523

[56] References Cited

U.S. PATENT DOCUMENTS

| 4,124,286 | 11/1978 | Barasch | 355/3 R |
| 4,218,130 | 8/1980 | Satomi et al. | 355/25 |
| 4,303,332 | 12/1981 | Sakai | 355/14 R |
| 4,334,765 | 6/1982 | Clark | 355/55 |
| 4,354,757 | 10/1982 | Ritzerfeld | 355/7 |
| 4,379,631 | 4/1983 | Kitamura | 355/14 R |
| 4,439,790 | 3/1984 | Yoshida | 358/256 |
| 4,493,108 | 1/1985 | Fryer et al. | 382/48 |
| 4,505,574 | 3/1985 | Kurata et al. | 355/8 |
| 4,538,183 | 8/1985 | Kanno et al. | 358/287 |
| 4,554,592 | 11/1985 | Yoshida | 358/257 |
| 4,558,374 | 12/1985 | Kurata et al. | 382/16 |
| 4,561,061 | 12/1985 | Sakamoto et al. | 364/518 |
| 4,580,171 | 4/1986 | Arimoto | 358/287 |
| 4,582,417 | 4/1986 | Yagasaki et al. | 355/7 |
| 4,591,904 | 5/1986 | Urabe et al. | 358/287 |
| 4,597,051 | 6/1986 | Beausoleil et al. | 364/523 |
| 4,627,707 | 12/1986 | Tani et al. | 355/7 |
| 4,655,580 | 4/1987 | Watanabe et al. | 355/7 |

FOREIGN PATENT DOCUMENTS

| 0081767 | 6/1983 | European Pat. Off. . |
| 0083989 | 7/1983 | European Pat. Off. . |
| 0105517 | 4/1984 | European Pat. Off. . |
| 0106291 | 4/1984 | European Pat. Off. . |
| 2089165 | 6/1982 | United Kingdom . |

OTHER PUBLICATIONS

Dialog Abstracts, DE 3112275.

*Primary Examiner*—Kevin J. Teska
*Attorney, Agent, or Firm*—Fitzpatrick, Cella, Harper & Scinto

[57] ABSTRACT

An image processing apparatus includes input means for inputting data for a plurality of image areas, selection means for selecting desired ones of the image areas, and output means for outputting the selected image area under a predetermined condition.

46 Claims, 28 Drawing Sheets

Fig. 10-A
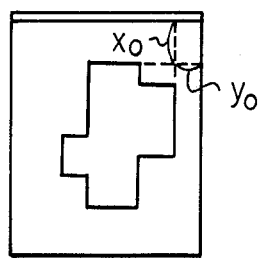
Fig. 10-B
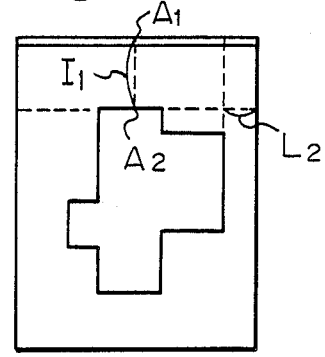
Fig. 10-C
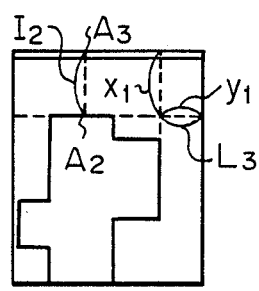
Fig. 10-D
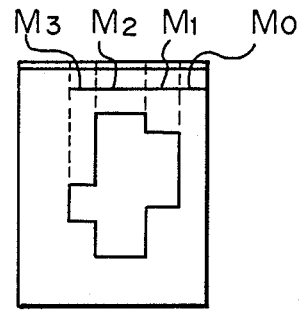
Fig. 10-E
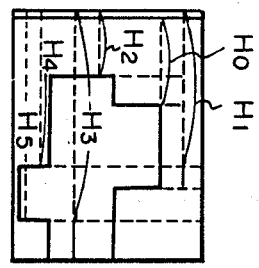
Fig. 10-F
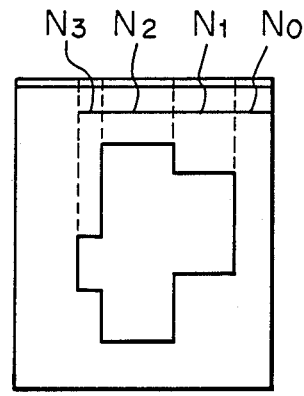

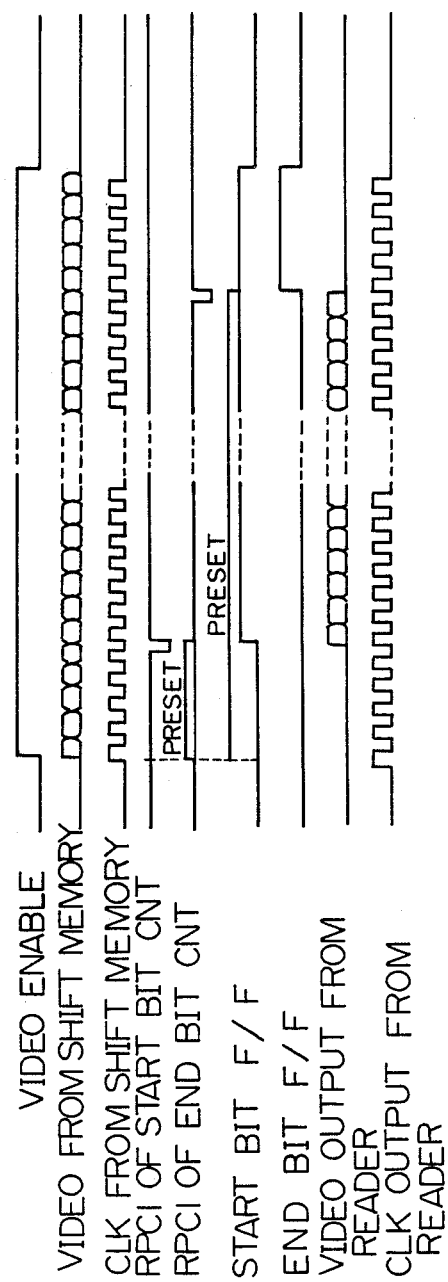

Fig. 10-H
| | START BIT COUNTER | END BIT COUNTER |
|---|---|---|
| INITIALIZATION | PRESET AT 4751 BITS | PRESET AT 4751 BITS |
| NUMBER OF LINES, $N_0$ | PRESET AT $H_0$ BITS | PRESET AT $H_1$ BITS |
| NUMBER OF LINES, $N_1$ | PRESET AT $H_2$ BITS | PRESET AT $H_3$ BITS |
| NUMBER OF LINES, $N_2$ | PRESET AT $H_4$ BITS | PRESET AT $H_5$ BITS |
| NUMBER OF LINES, $N_3$ | PRESET AT 4571 BITS | PRESET AT 4751 BITS |
Fig. 10-I
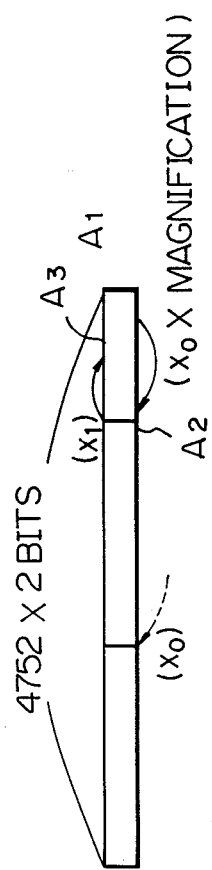

Fig. 10-J
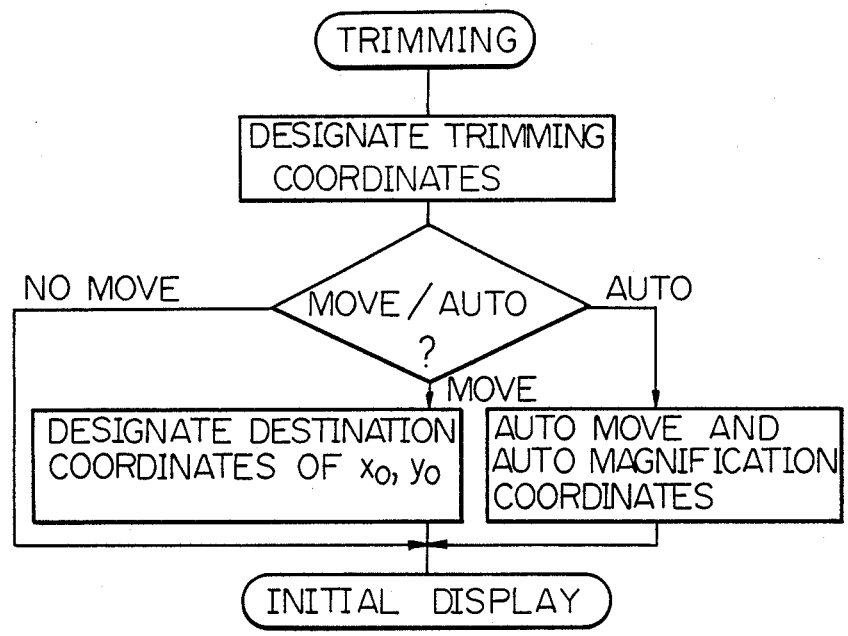
Fig. 10-K
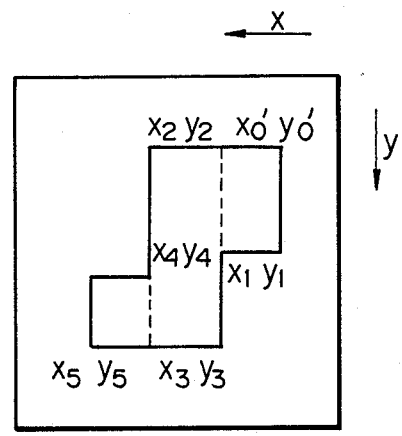

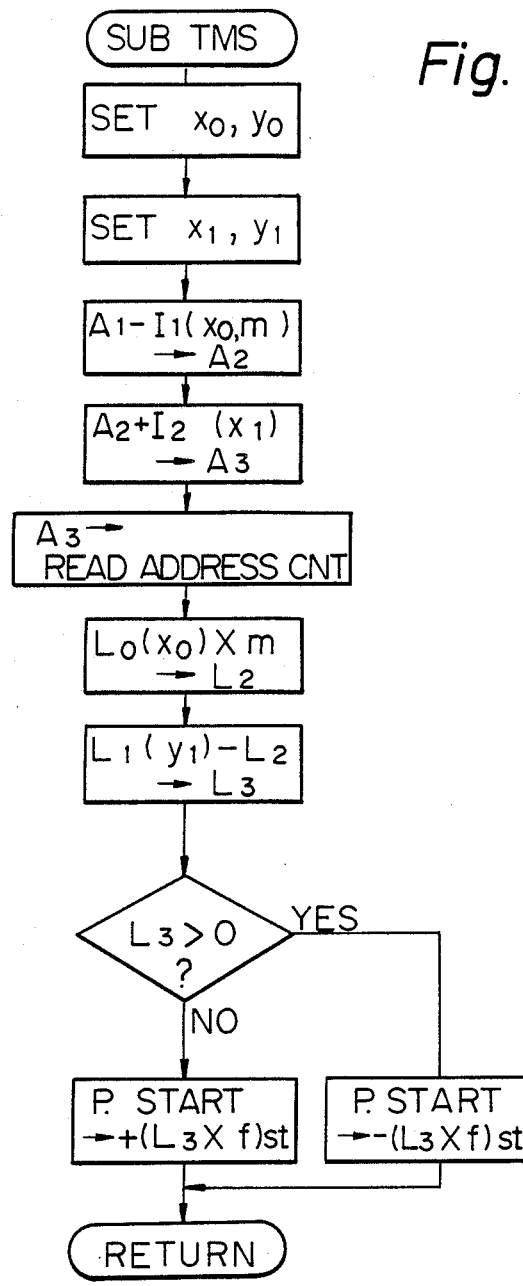
Fig. 10-L

Fig. 13-2 (CENTERING)

1. SET TRIMMING POINT:
   MAX VALUE OF X,Y DIRECTION
   → $T_{XMAX}, T_{YMAX}$
   MIN VALUE OF X,Y DIRECTION
   → $T_{XMIN}, T_{YMIN}$

DESIGNATE DESTINATION:
CENTERING

2. DESIGNATE MAGNIFICATION:
   $M_X, M_Y$

3. DESIGNATE CASSETTE:
   COPY PAPER LENGTHS OF
   X,Y DIRECTION → PS-X, PS-Y

4. $TXM = \dfrac{PS\text{-}X - (TXMAX - TXMIN) * MX}{2}$ $TYM = \dfrac{PS\text{-}Y - (TXMAX - TYMIN) * MY}{2}$ 5. TXM, TYM ≥ 0 ?
   YES ↰
   NO (TXM<0 or TYM<0)
   TXM=0, TYM=0
   WARNING MOVE $T_{XMIN}$ to $T_{XM}$
MOVE $T_{YMIN}$ to $T_{YM}$

END

Fig. 14-1(a)
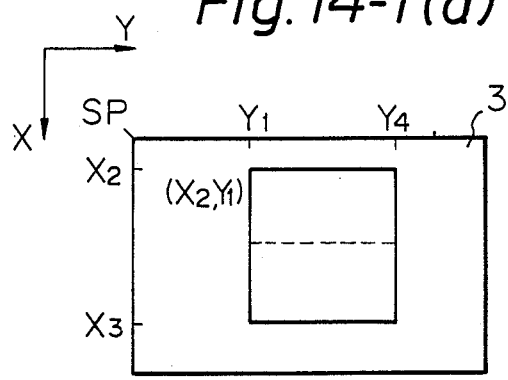
Fig. 14-1(b)
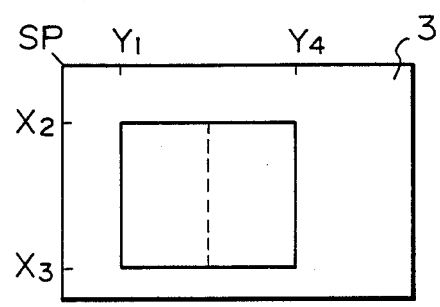
Fig. 15-2
| SEQX$_j$ ← | 4 | 3 | 2 | 1 | |
|---|---|---|---|---|---|
| | D | C | B | A | 1 |
| | H | G | F | E | 2 |
| | L | K | J | I | 3 |
↓ SEQY$_j$
Fig. 15-3
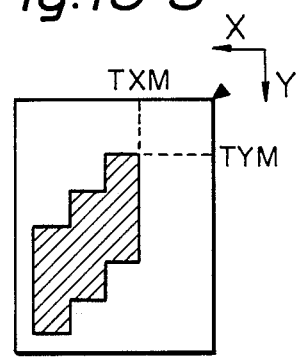

Fig. 14-3

| RATIO OF ORIGINAL LENGTH<br>DECISION CONDITION<br>$R = \dfrac{MX \times \frac{X_3-X_2}{2}}{MY \times Y_4-Y_1}$ | $\dfrac{PS-X}{PS-Y} > 1$ | $\dfrac{PS-X}{PS-Y} < 1$ |
|---|---|---|
| $1 \leq R < 4R$ | R UPPER AND LOWER PAGES | R UPPER AND LOWER PAGES |
| $R < 1 < 4R$ | 4R LEFT AND RIGHT PAGES | R UPPER AND LOWER PAGES |
| $R < 4R \leq 1$ | 4R LEFT AND RIGHT PAGES | 4R LEFT AND RIGHT PAGES |

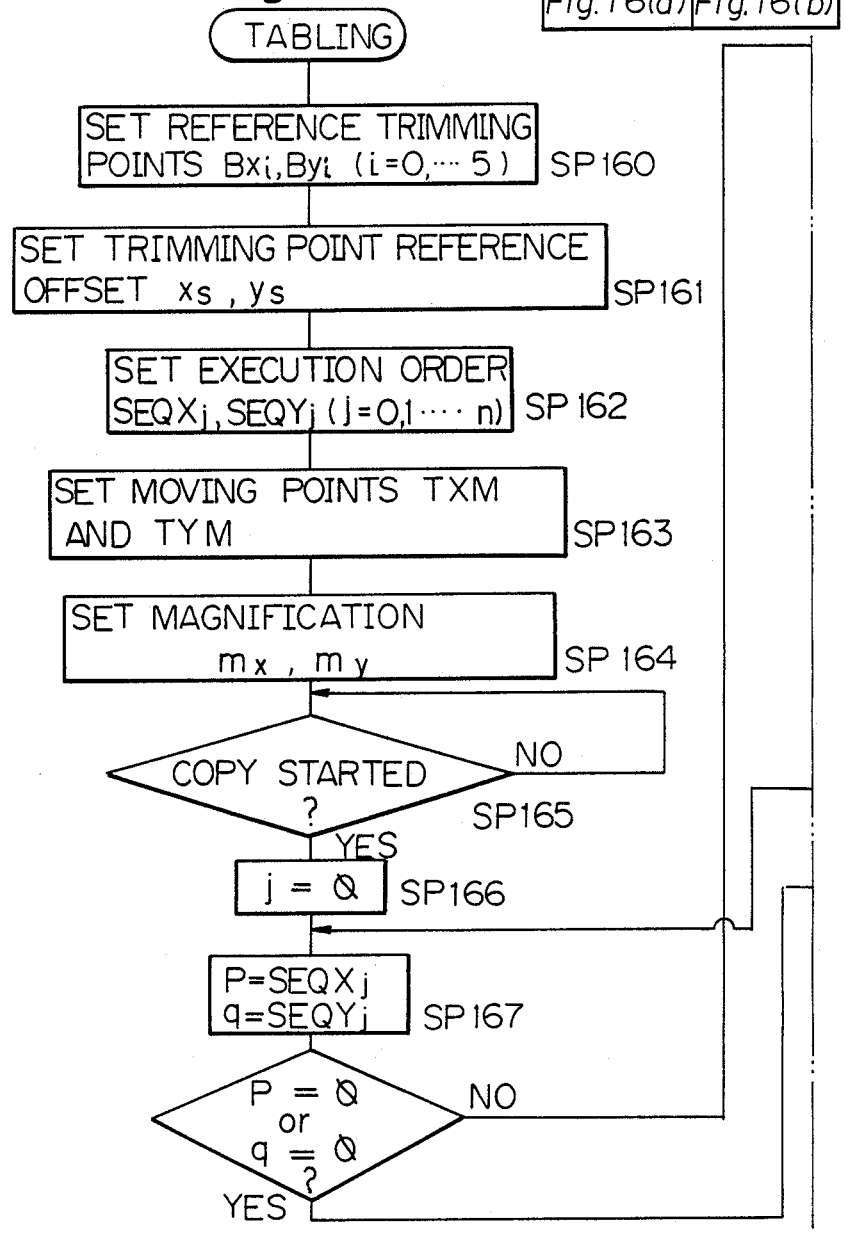

IMAGE PROCESSING APPARATUS WHICH SELECTABLY OUTPUTS IMAGE INFORMATION

This application is a continuation of application Ser. No. 093,083 filed Aug. 31, 1987, now abandoned which was a continuation of Ser. No. 673,410, filed Nov. 20, 1984, now abandoned.

BACKGROUND OF THE INVENTION

1. Field of the Invention

The present invention relates to an image processing apparatus such as a copying machine which photo-electrically converts an image into a digital image signal for processing.

2. Description of the Prior Art

In prior art image processing apparatuses, such as a copying machine, an original image is directly projected onto a photoconductor and hence an image beyond a desired area is copied. For example, when divisional lists are to be prepared from a parent list, an overlay format having an opening is manually overlayed to mask the unnecessary areas. However, this takes time and manpower and is not an accurate operation.

SUMMARY OF THE INVENTION

It is an object of the present invention to provide an image processing apparatus which can reproduce a copy of a desired one of a plurality of areas on an original image in a desired format.

It is another object of the present invention to provide an image processing apparatus which can reproduce any desired divisional lists from a parent list in a desired sequence by a single output command without shifting an original sheet.

It is another object of the present invention to provide an image processing apparatus which discriminates longitudinal or lateral i.e. latitudinal, orientation of a book original sheet and scans the original sheet longitudinally.

It is a further object of the present invention to provide an image processing apparatus which can reproduce multi-division image areas in a desired output format by means of a single input.

BRIEF DESCRIPTION OF THE DRAWINGS

FIG. 1-2 shows a sectional view of a construction of a reader and a printer,

FIGS. 2-1 and 2-2 show a main scan direction of the reader and the printer and an output image;

FIG. 3 comprising FIG. 12-1 shows an original sheet mounted on an original sheet glass 3, FIG. 12-2 shows a coordinate detection circuit, FIG. 12-3 shows a flow chart for detecting the ratio of sizes of a cassette and an original sheet, FIG. 12-4 shows a flow chart for detecting ratios of sizes of the cassette and the original sheet in x and y directions, FIGS. 13-1 and 13-2 illustrate centering, FIGS. 14-1a, 14-1b, 14-2a, 14-2b-1, 14-2b-2 and 14-3 illustrate a book copying mode, and FIGS. 15-1, 15-2, 15-3, 16a and 16b illustrate preparation of divisional lists from a parent list.

DETAILED DESCRIPTION OF THE PREFERRED EMBODIMENTS

Figure 1:
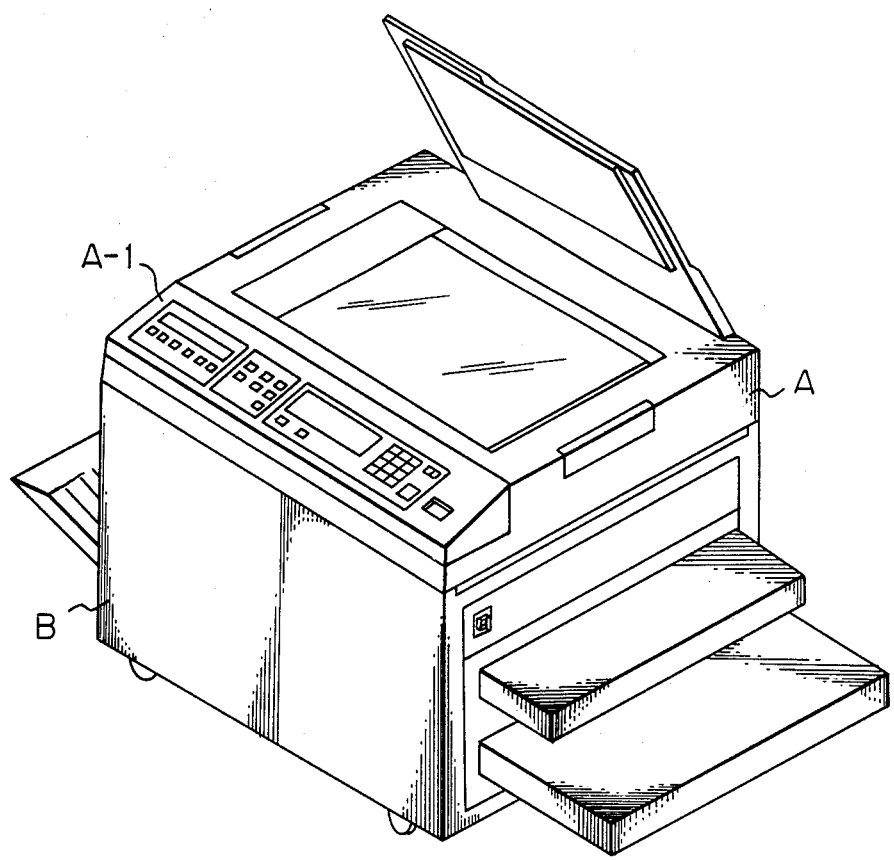
FIG. 1-1 shows an external view of a copying machine.

FIG. 1-1 shows an external view of a copying machine comprising the present invention. It basically comprises two units, a reader A and a printer B. The reader and the printer are separated both physically and functionally and can be used individually. They are connected through an electrical cable. The reader A has a console panel A-1 to be described later.

Figures 1, 2:
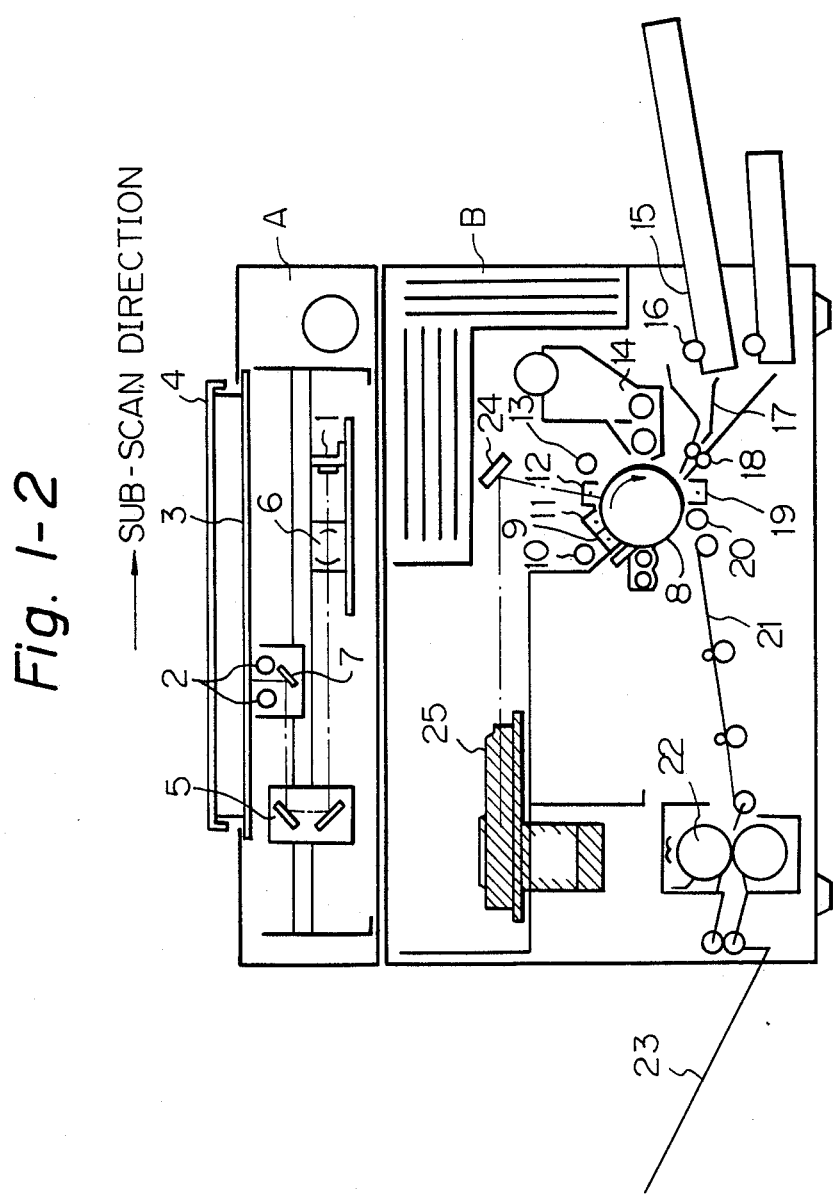
Figures 1, 2:
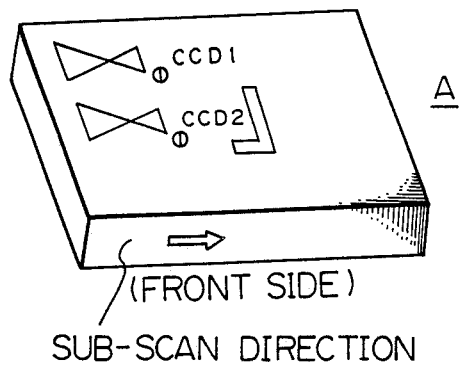
Figure 2:
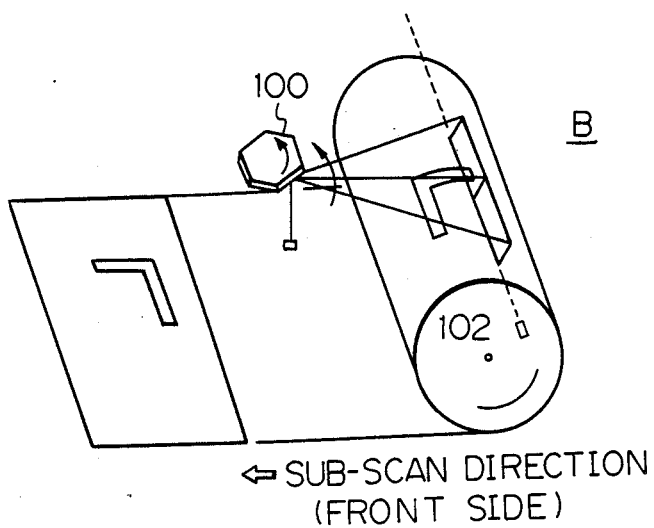

FIG. 1-2 shows a sectional view of a construction of the reader A and the printer B. An original sheet is placed face down on an original sheet glass 3 and a mounting reference is located at an inner left position as viewed from the front of the apparatus. The original sheet is pressed against the original sheet glass 3 by an original sheet cover 4. The original sheet is illuminated by a fluorescent lamp 2 and the light reflected thereby is condensed onto a CCD 1 through mirrors 5 and 7 and lens 6. The mirrors 5 and 7 are moved at a relative velocity ratio of two. The optical unit is moved from left to right at a constant velocity while it is phase-lock loop controlled by a DC servo motor. The velocity is 180 mm/sec in the forward movement in which the original sheet is illuminated, and 468 mm/sec in the return movement. The resolution in a sub-scan direction is 16 lines/mm. The size of the original sheet to be handled is A5 - A3 and the orientation of the original sheet is longitudinal for the sizes A5, B and A4 and lateral for the sizes B4 and A3. The optical unit is returned when an image leading edge sensor (to be described later) senses video enable signals from the reader by the number corresponding to the size of the original sheet.

A main scan width depends on the orientation of the original sheet and is equal to 297 mm at a maximum which corresponds to the lateral length of the size A4 sheet. In order to attain the resolution of 16 pels/mm, 4752 (=297×16) bits are required for a CCD. In the present apparatus, two 2688-bit CCD array sensors are driven in parallel. Under the condition of 16 lines/mm and 180 mm/sec, a main scan period (i.e. a storage time of the CCD) T is equal to $$T = \frac{1}{v \cdot n} = \frac{1}{180 \times 16} = 347.2 \ \mu\text{seconds.}$$

A transfer rate of the CCD is $$f = \frac{N}{T} = \frac{2628}{347.2 \ \mu\text{sec}} = 7.7419 \ \text{MHz.}$$

Referring to FIG. 1-2, the printer under the reader is now explained. A bit-serialized image signal processed in the reader is supplied to a laser scanning optical unit 25 of the printer. This unit comprises a semiconductor laser, a collimeter lens, a rotating polygon mirror, an F-O lens and a correction optical system. The image signal from the reader is applied to the semiconductor laser which electro-optically converts the signal and a laser beam emitted thereby is collimated by a collimeter lens and directed to the polygon mirror which is rotated at a high speed so that the laser beam scans a photoconductor drum 8. A rotating speed of the polygon mirror is 2600 rpm. A scan width is approximately 400 mm and an effective image width is 297 mm which corresponds to the lateral length of an A4 sheet. Accordingly, a signal frequency applied to the semiconductor laser is approximately 20 MHz (NRZ). The laser beam from the unit is directed to the photoconductor drum 8 through a mirror 24.

The photoconductor drum may comprise three layers, a conductive layer, a photosensitive layer and an insulative layer. Process components for forming an image are arranged therearound. Numeral 9 denotes a pre-discharger, numeral 10 denotes a predischarge lamp, numeral 11 denotes a primary charger, numeral 12 denotes a secondary charger, numeral 13 denotes a flat exposure lamp, numeral 14 denotes a developing unit, numeral 15 denotes a paper cassette, numeral 16 denotes a paper feed roller, numeral 17 denotes a paper feed guide, numeral 18 denotes a regist roller, numeral 19 denotes a transfer charger, numeral 20 denotes a separation roller, numeral 21 denotes a convey guide, numeral 22 denotes a fixing unit and numeral 23 denotes a tray. Velocities of the photoconductor drum 8 and the convey unit are 180 mm/sec which is identical to the velocity of the reader in the forward movement. Accordingly, copy speed when the reader and the printer are combined is 30 sheets/min for an A4 sheet. The printer has a separation belt on a front side to separate the record paper in contact with the photosensitive drum. Accordingly, the image is lost by a length corresponding to a belt width. If a signal is carried on that area, that area is developed and the separation belt is contaminated by the toner and the record paper is also contaminated. Accordingly, the printer suppresses the video signal at the printer output for a period corresponding to the belt width of 8 mm. If the toner is deposited to a leading edge of the record paper, the record paper would be wrapped around the fixing roller in the fixing cycle and cause jamming. Accordingly, the electrical signal is suppressed at the reader so that the toner is not deposited on the leading edge of the record paper by a length of 2 mm. FIGS. 2-1 and 2-2 show main scan directions of the reader and the printers and an output image. In the reader, the scan is effected from the rear side to the front side, and in the printer, the scan is effected from the front side to the inner side.

The present copying machine has intelligent functions, such as image edition. In the reader, the signal read by the CCD is processed so that the output from the reader always has a constant number of bits (4752 bits) and a constant rate. The intelligent functions may include enlargement/reduction with a magnification between 0.5 and 2.0, trimming of a specified area of an image, movement of a trimmed image to a desired position on a record paper, and recognition of an original sheet mounted on the original sheet glass. It may also include a combined function of those intelligent functions. FIG. 3 shows examples thereof.

Figure 3A:
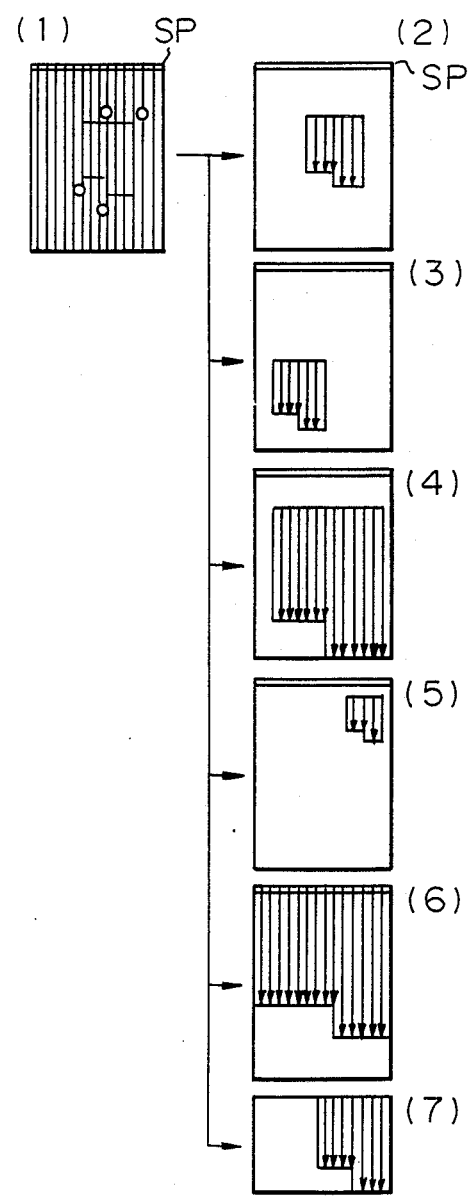
FIGS. 3a–3c illustrates a composite function of intelligent functions.

FIG. 3(a) shows an edit function in which (1) shows an original sheet surface, (2) shows a copy reproduced when only trimming coordinates are specified, (3) shows a copy reproduced when the trimming coordinates and target coordinates are designated (in which an error is indicated if a size of the record paper is exceeded), (4) shows a copy reproduced when the trimming coordinates, the target coordinates and an enlargement magnification are designated (in which an error is indicated if the size of the record paper is exceeded), (5) shows a copy reproduced when the trimming coordinates, the target coordinates and a reduction magnification are designated, (6) shows a copy reproduced when the trimming coordinates and an auto-magnification (magnification between 0.5 and 2.0 depending on the size of the cassette size), and (7) shows a copy reproduced when the trimming coordinates and auto-magnification are designated. The trimming coordinates to be shifted to the target coordinates are determined based on the smallest coordinate point in the sub-scan direction.

Figure 3B:
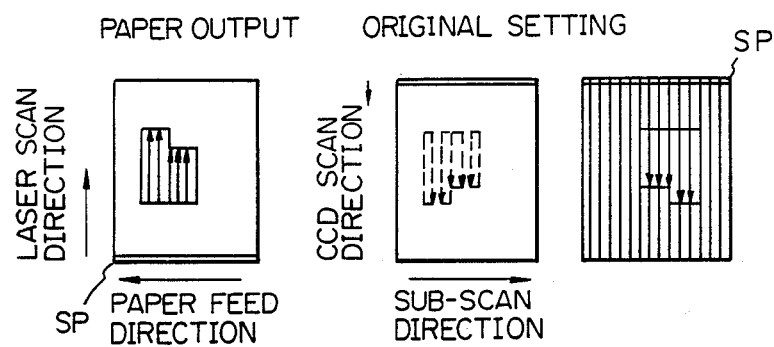
Figure 3C:
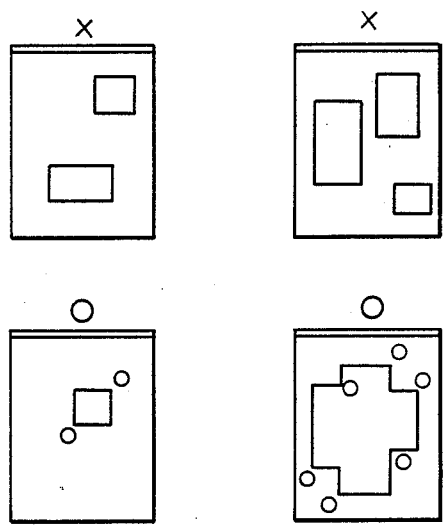

FIG. 3(b) shows a relationship between the CCD and the main scan direction of the laser, and FIG. 3(c) illustrates a manner of designating the trimming coordinates.

For a frame encircled by lines, the designations are made in the order of ①-⑥. The coordination designations are done by a ten-key keypad 108 shown in FIG. 4.

Figure 4:
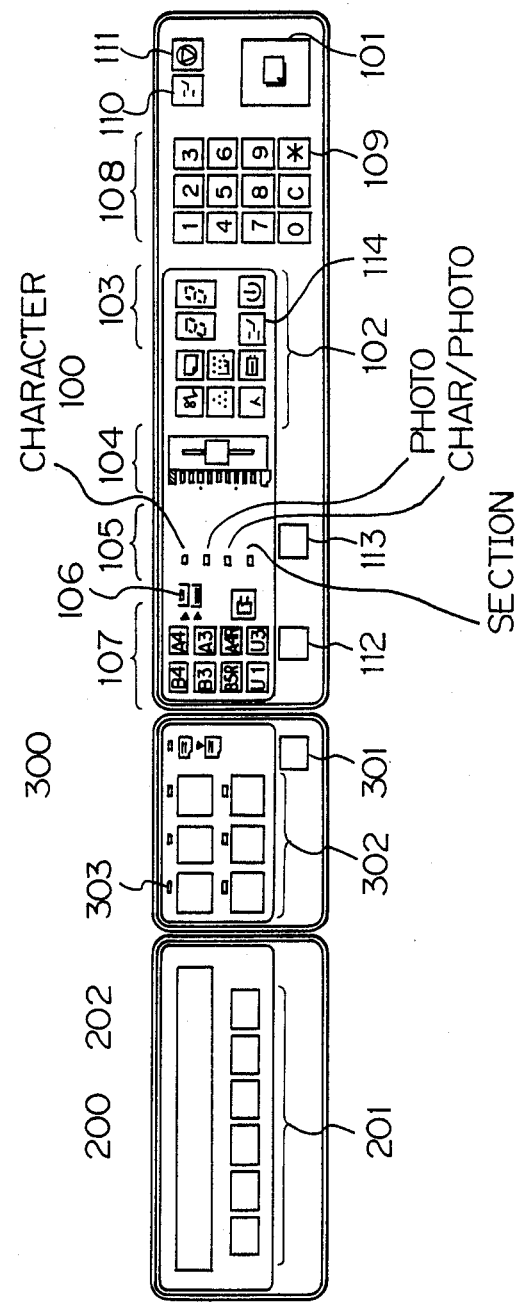
FIG. 4 shows a detail of a console panel.

FIG. 4 shows a detail of the console panel A-1 of FIG. 1. It is divided into three blocks. The rightmost block is a general purpose key/display 100 which a conventional copying machine has. The middle block is a function key/display 300 by which a user can select a desired one of programmed and registered copy/transmission functions. The leftmost block is a soft key/display 200 by which the user can create desired copy/transmission functions. The general purpose key/display 100 is first explained. Numeral 107 denotes a seven-segment LED display for displaying a preset copy count and a count of copies reproduced. Numeral 102 denotes a warning display for warning of a jam, lack of toner, lack of paper and copy interruption, which the conventional copying machine has. Numeral 104 denotes a copy density selection lever and a density display. Numeral 105 denotes a display for indicating character image, graphic image, character and graphic image or section paper image. It is provided to apply an optimum image processing for each of the four types of the original image. Numeral 106 denotes a display for indicating whether an upper paper cassette or a lower paper cassette has been selected. Numeral 107 denotes a display for indicating the paper size of the selected paper cassette. Numeral 108 denotes a ten-key keypad having keys 0-9 and C, which is used to enter data (for example, trimming coordinates, target. coordinates, magnification, destination address, etc.) in the course of creation of the program by the soft key/display 200 and setting the count to the display 103. Numeral 109 denotes an entry key which is a confirmation key for the key entry by the soft key/display 200. Numeral 110 denotes an interrupt key for interrupting a multi-copy mode for another multi-copy mode, numeral 111 denotes a copy cancel key for stopping the multi-copy mode of the printer, numeral 101 denotes a copy key for starting a print operation of the printer, numeral 113 denotes an original image selection key for the display 105, and numeral 112 denotes a cassette selection key. Each time key 113 or 112 is depressed, the selection is shifted to the lower one. A cover of the function key/display 300 is removable in construction because the keys 302 must be marked with function names since the functions created by the soft key/display are registered to the keys 302. Accordingly, after the functions have been registered, the cover is removed and the names of the registered functions are written on the corresponding keys 302, and then the cover is again attached. Since six function keys 302 are provided, the user may register six functions. When the user creates the function by the soft key display 200, an inquiry message as to whether it is to be registered is displayed on the display 202. By responding to it by the soft key 201, the six displays 303 corresponding to the six keys on the function display 300 flash. This is an inquiry from the machine to the operator as to "which one of the functions is to be registered?". If the operator depresses one of the keys, the display corresponding to the depressed key is turned on and the other displays are turned off. The operator removes the cover and writes the function name on the key and again attaches the cover. The registered content is subsequently maintained even if the power supply is turned off because the memory is backed up by a battery. A key 301 is a standard mode reset key.

Figure 5:
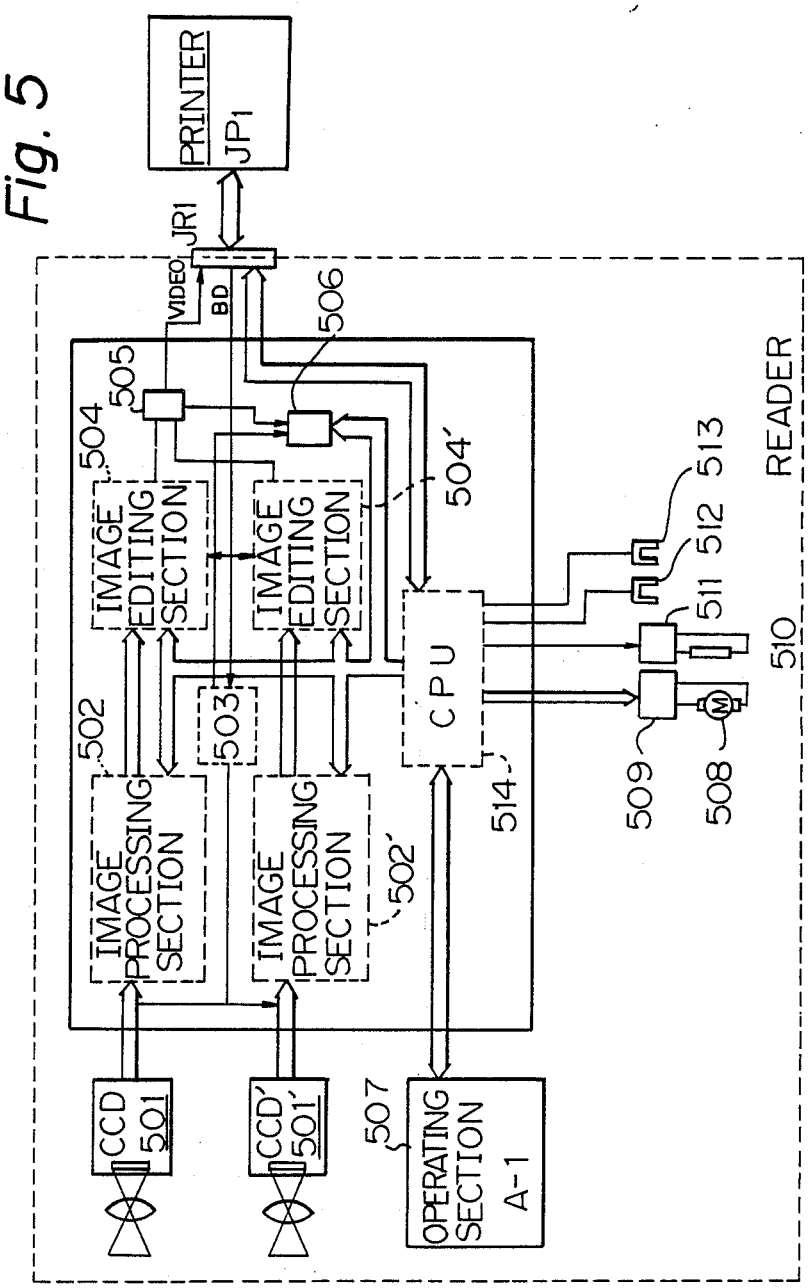
FIG. 5 shows a system block diagram of the reader unit.
Figures 6, 7, 8:
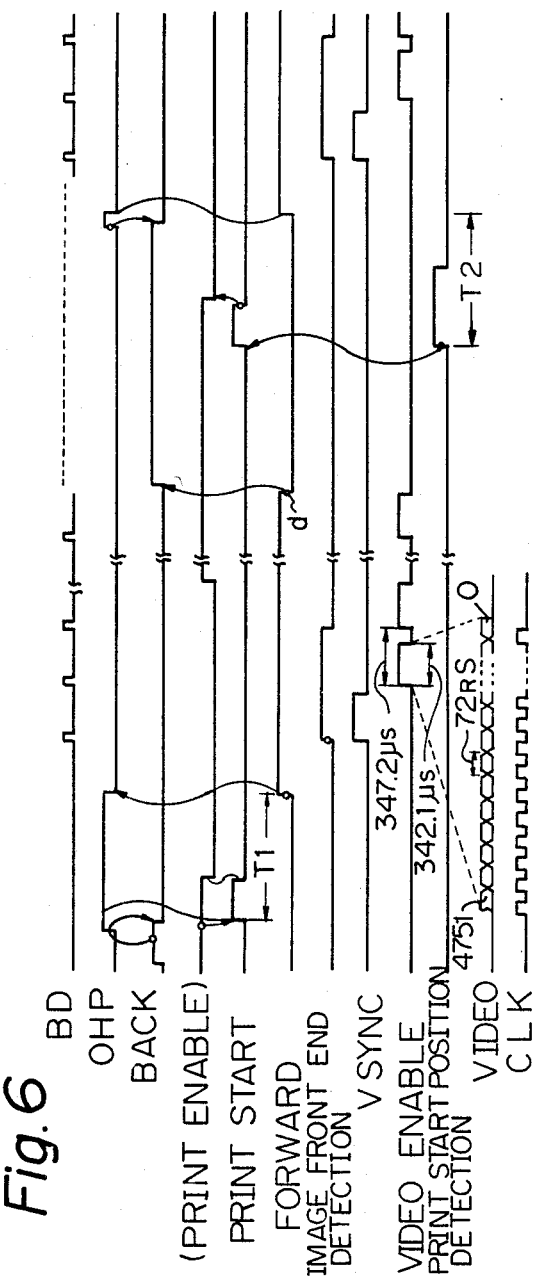
FIGS. 6 and 7 show timing charts of interface signals.
FIG. 8 shows a sensor of a scanning optical system of the reader.

A detail of the reader unit is now explained. FIG. 5 shows a system block diagram of the reader unit. An interface signal to the reader is shown on the right hand side When it is to be connected to the printer, a connector JR1 is connected to a connector JP1 of the printer. Timings of the interface signals of JR1 are shown in FIGS. 6 and 7. A beam detect signal BD synchronizes the printer with the rotation of the scanner when the printer is connected and it corresponds to a leading edge signal of each line. A video signal VIDEO produces 4752 pulses per line with one pixel having a width of 55 ns. Each pixel may have up to three states, "0", "½" and "1". For "0", the signal is L-level for 55 ns, for "½", the signal is H-level for a first half (27.5 ns) of the period and L-level for the latter half period, and for "1", the signal is H-level for 55 ns.

The signal is produced in synchronism with the beam detect signal when the printer is connected, and produced in synchronism with an internal pseudo-signal in other cases (for example, transmission to another unit). A video enable signal is produced during the output of the 4752-bit video signal. It is also produced in synchronism with the beam detect signal or the internal pseudo-signal. A VSYNC signal is produced in synchronism with an output of an image leading edge sensor 37b in FIG. 8 and the beam detect signal or the internal pseudo-signal. It indicates, that the video data follows. A signal width is the same as that of the video enable signal. A print start signal is a paper feed command signal to the printer. An interval between the print start signal and the VSYNC signal is determined by a control circuit (FIGS. 9 and 11) in accordance with a magnification and a trimming area. A print end signal is a response signal from the print. It is, produced when a trailing edge of the record paper leaves the photoconductor drum and rides on the convey belt. It indicates the end of the print operation. It detects the end of separation of the record paper and is issued by a sequence timing. A printer connect signal is produced when the printer is connected. A corresponding terminal in the printer is grounded. The printer is enabled thereby.

S DATA, S CLK CSK BUSY and PSC BUSY signals are serial signals for establishing between the reader and the printer (signal exchange such as permission of transmission and signaling between the reader and the printer).

The S DATA and S CLK are 16-bit protocol data and clock on bilateral lines. The CSC BUSY signal is produced when the reader issues the data and the clock onto those lines, and the PSC BUSY signal is issued when the printer issues the data and clock onto those lines. Accordingly, they indicate the transmission directions of the S DATA and S CLK signals. A detailed timing chart shown in FIG. 7.

Referring back to FIG. 5, the system block of the reader is now explained. CCD readers 501 and 501' include CCD's, CCD clock drivers, CCD signal amplifiers and A/D converters. Control signals to the CCD are generated by CCD control signal generators 503 and 503' and supplied to the clock drivers of the CCD readers 501 and 501'. The control signals are generated in synchronism with the horizontal sync signal BD from the printer. The CCD readers 501 and 501' produce 6-bit digital video data, which are supplied to image processing circuits 502 and 502'. The image processing circuits 502 and 502' each includes a sampling circuit for sampling the CCD output to control the light intensity of the light source by the CPU, a detector for detecting shading of the light source and the lens, a peak hold circuit for detecting a peak of the light intensity in the main scan for AE function, and a quantization circuit for binarizing or ternarizing the 6-bit video data after the shading correction by determining a slice level in accordance with the peak value held in the immediately previous line or the second previous line or a dither pattern. The video signals quantized by the image processing circuits 502 and 502' are supplied to image edit circuits 504 and 504'. Each of the image edit circuits 504 and 504' include a two-line buffer memory. Each line has a capacity which is twice as large as the number of pixels in one line, i.e. 4752, because in a 200% enlargement mode the pixel data is written into the memory at double the sampling rate and hence the data volume is doubled. Because the memory cannot be read and written simultaneously, the image is written into the N-th line of the first memory while the image is read from the (N−1)th line of the second memory. Accordingly, the two-line buffer memory is needed. A write address counter for writing the video data into the buffer memory, a read address counter for reading the video data from the buffer memory, and an address selector for selecting address signals from those counters are provided. The counters are presettable parallel load counters and initial values are set by the CPU through I/O ports. The CPU presets the addresses corresponding to the main scan coordinates into the counters each time the sub-scan reaches the line corresponding to the trimming coordinates, in accordance with the coordinate information designated by the console panel to enable the edition of the original sheet information. A coordinate area control counter and a gate are provided to enable white masking, black masking, white frame trimming and black frame trimming. A joint detection shift register is provided for automatically combining the output of the CCD's. The video signals from the image edit circuits are first outputted from 504 and next from 504'. A synthesize circuit 505 smoothly synthesizes those signals into one serial video data. A recognition circuit 506 pre-scans the original sheet during an idling rotation period of the printer after the copy button is depressed to detect the coordinates of the original sheet. It includes a shift register for detecting eight continuous bits of white video data, an I/O port and a main/sub scan counter. A console panel 507 includes a key matrix, LED's, liquid crystal displays and liquid crystal drivers. Numeral 508 denotes an optical system scanning DC motor and numeral 509 denotes a drive circuit therefor. Numeral 510 denotes an original sheet illuminating fluorescent lamp, numeral 511 denotes a drive circuit therefor, numeral 512 a photo-sensor for detecting whether the optical system unit is at a home position, and numeral 513 denotes a photo-sensor for detecting whether the optical system unit is at a position to illuminate the leading edge of the original sheet. The CPU 514 comprises CPU, ROM, RAM, battery back-up circuit, timer circuit and I/O interface. The CPU 514 controls the console panel 507, controls an operation sequence of the reader in accordance with an instruction from the operator and controls the printer by the command. Prior to or during the scan of the original sheet, the CPU 514 sets data in counters of the image processing circuits 502 and 502' and the image edit circuits 504 and 504' in accordance with the instruction for the image processing from the console panel 507. Prior to the scan of the original sheet, the CPU controls the light intensity of the fluorescent lamp drive circuit 511 in accordance with light intensity data from the image processing circuit, presets a velocity data to the DC motor drive circuit 509 in accordance with a magnification command, and collects image combining data from the image edit circuits 504 and 504' to calculate amount of combined light.

Figure 9:
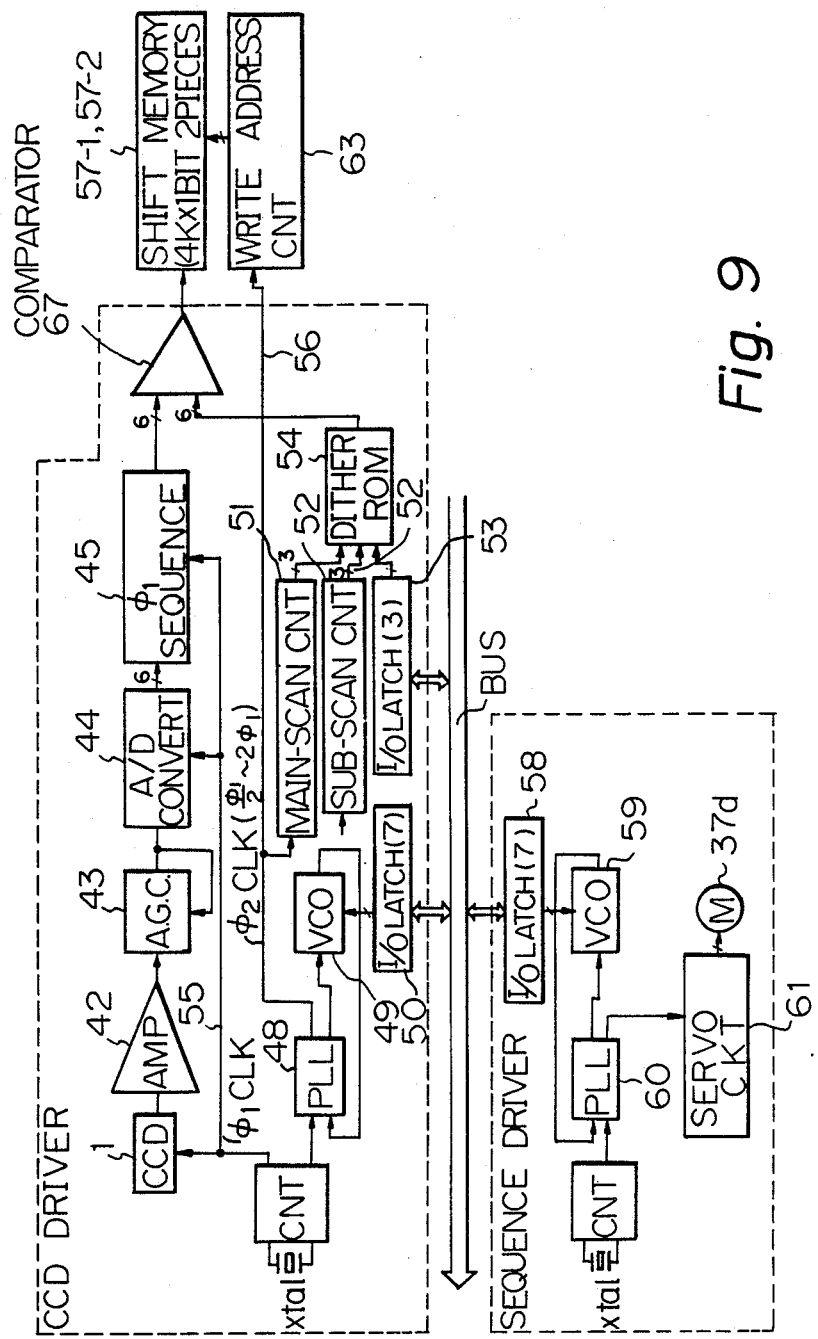
FIG. 9 illustrates an enlarging/reducing method of an original image, FIGS. 10-A to 10F illustrate trimming, FIG. 10-G shows count data, FIG. 10-H shows preset counts of a start bit counter and an end bit counter, FIG. 10-I shows a read start address point, FIGS. 10-J to 10-L show flow charts to trimming, enlarging/reducing and shifting, FIG. 11 comprising

Referring to FIGS. 8 and 6, the sequence control is now explained. As shown in FIG. 8, three position sensors 37a–37c are arranged on the scanning optical system of the reader. The leftmost one as viewed from the front of the reader is an optical system home position sensor (which produces a signal OHP). The optical system is normally stationary at the home position. As the reader is driven, the optical system starts to scan from left to right. An image leading edge sensor 37b is located at a reference position of the image. When the sensor 37b senses the leading edge of the image, the control circuit produces the video data signal (VIDEO, CLK) and a signal (VIDEO ENABLE) indicating a valid data period in each main scan cycle (374.2 μs). The control circuit starts to count the VIDEO ENABLE signals in response to the output from the sensor 37b, and when the count reaches α corresponding to the cassette size of the printer or the magnification, the control circuit turns off the optical system forward drive signal and turns on the backward drive signal. A print start sensor 37c is located in the return path. When the optical system actuates the sensor 37c after the reversal of the movement, the control circuit checks if the scan was made by the number of times corresponding to the designated number of copies, and if the number of times of scan is not equal to the designated number of copies, the control circuit produces the print start signal to instruct the next paper feed to the printer. The position of the sensor 37c should be adjusted such that T2 and T1 in FIG. 9 are equal.

The enlargement/reduction method of the original image is explained with reference to FIG. 9. A basic concept of the enlargement/reduction is that the velocity of the DC servo motor 37d in the sub-scan direction is variable. The CPU calculates the velocity in accordance with the key-entered magnification, calculates a PLL frequency corresponding to the velocity, and presets it into the I/O latch (1) 58 prior to the scan. During the backward movement, a fixed value is set so that the optical system is returned at a high speed. This is attained by presetting the value stored in the ROM of the CPU into the I/O latch (1). When the magnification level is 2, the velocity is one half of the velocity (180 mm/sec) for unity magnification level, and when the magnification is ½, the velocity is two times as high. In the main scan, the CCD serial signal (after the A/D conversion) at the constant frequency is sampled at a clock rate corresponding to the magnification. For example, when the magnification level is 2, sampling is made at the clock rate which is two times as high as the CCD clock rate so that one bit is added to each bit of the source information, and when the magnification level is ½, sampling is made at one half of the CCD clock rate so that one bit is taken out from every two bits of the source information. The CPU calculates the clock rate based on the input magnification and sets it into the I/O latch (2) 50 prior to the subscan. As described above, the CCD comprises 2628 bits, of which 36 bits are dummy bits and 2592 bits are effective bits. The drive frequency is 7.569 MHz and the signal line is $\phi 1$ clock line 55. The clock $\phi 2$ for enlargement/reduction is generated by synchronizing the source oscillation $\phi 1$ and the frequency oscillated by the VCO (9) in accordance with the content of the I/O latch (2) by a PLL 48. The 2592-bit analog signal from the CCD is amplified by an AMP 42 and applied to an AGC 43. The AGC 43 detects a white level which varies due to a long range change of the light intensity of the fluorescent lamp or change of the background of the original sheet and clamps the white level so that a relative change from the white level is applied to an A/D converter 44. The output of the AGC is A/D converted to a binary 6-bit parallel signal. On the other hand, a dither ROM 54 outputs at 8-bit interval both in the main scan direction and in the sub-scan direction, and 32 weighting codes are stored in the 8×8, i.e., (64) bit matrix. Accordingly, by addressing the dither ROM 54 by a 3-bit main scan counter 51 and a 3-bit sub-scan counter 52, different weighting codes are outputted. A plurality of combinations of weighting codes are set in the 8×8 bit matrix and the reproducibility of a half-tone image can be varied by selecting one of the combinations. The selection of the combination is done by the I/O latch (3) 53. The presetting of the latch (3) is done by the CPU prior to the sub-scan. The main scan counter 51 is driven by the clock $\phi 2$ which varies with the magnification, and the sub-scan counter 52 is driven by the beam detect signal. The 6-bit weighting code from the dither ROM 54 and the A/D-converted 6-bit code are compared by a comparator 47 so that a binarized, serial half-tone reproducible image signal is produced.

A circuit 45 latches the input code by $\phi 1$ for synchronization because the A/D conversion time is different from bit to bit. The address counters of the shift memories 57-1 and 57-2 are driven by the clock $\phi 2$. Thus, the shift memories 57-1 and 57-2 receives 2592 bits when the magnification level is 1, 1296 bits when the magnification level is ½ and 5184 bits when the magnification level is 2.

The velocity of the sub-scan DC motor 37d is controlled by applying the preset value of the I/O latch (1) 58 to the VCO 59, synchronizing the oscillation frequency of the VCO 59 with the source oscillation by the PLL 60 and applying it to the servo circuit 61.

Figure 11A:
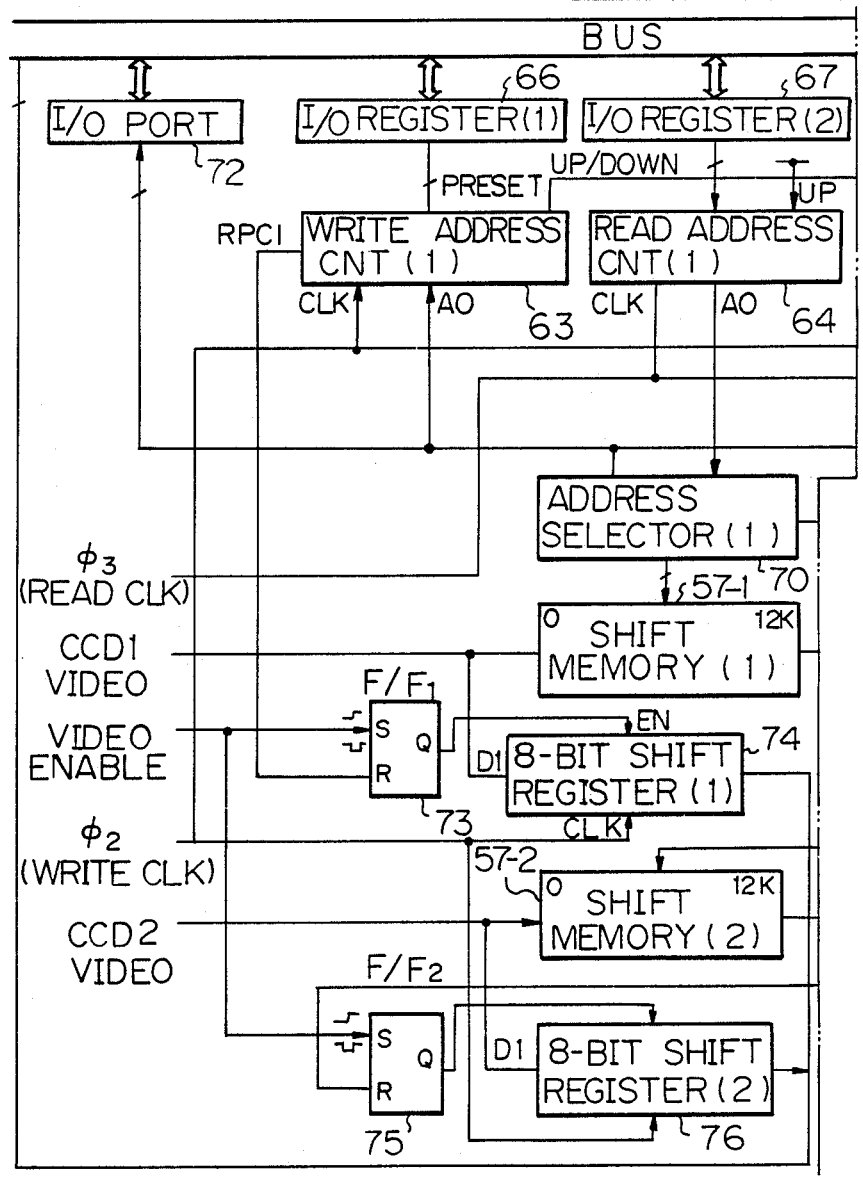
FIGS. 11a and 11b shows a shift memory circuit.
Figure 11B:
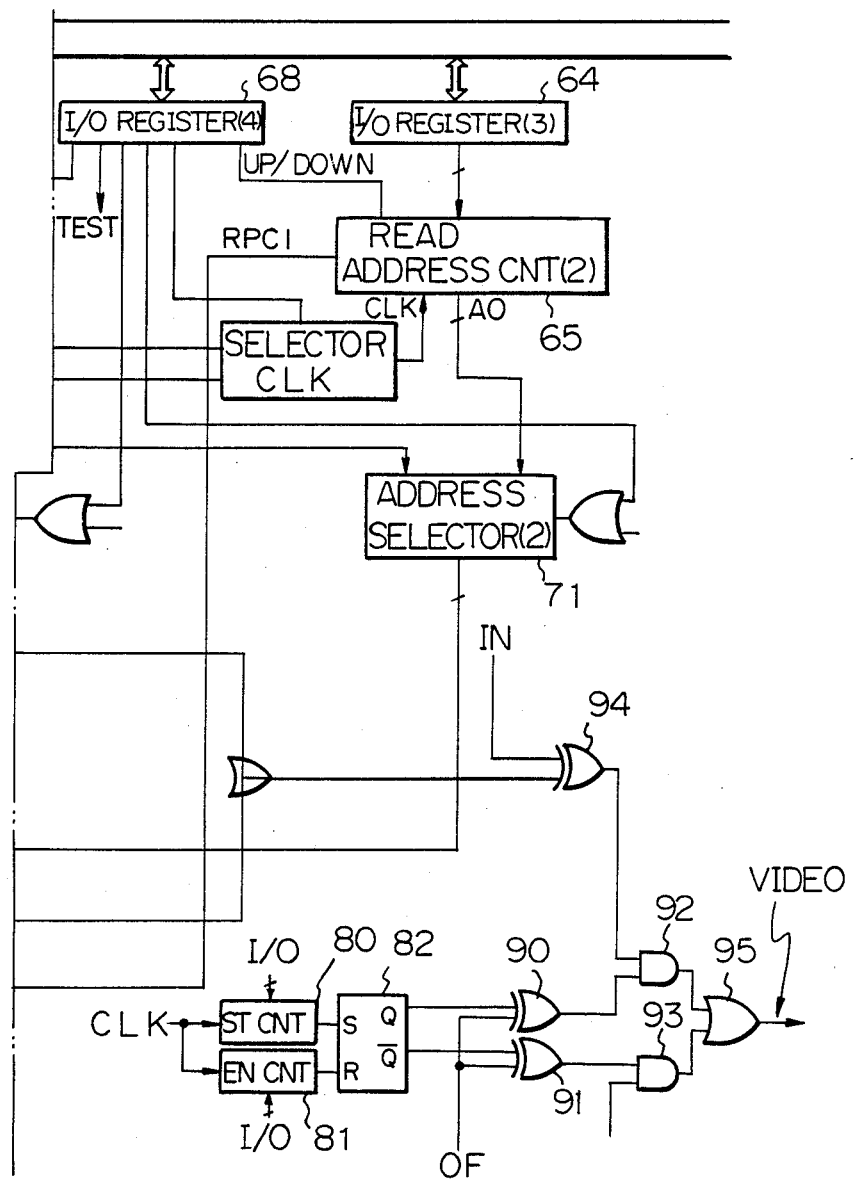

FIG. 11 shows a circuit of the shift memories. (1) is a static memory in which video data of the CCD 1 is stored. A write address counter 63 is an address counter for writing data into the shift memories (1) and (2). A read address counter (1) is an address counter for reading data from the shift memory (1), and a read address counter (2) is an address counter for reading data from the shift memory (2). An address selector (1) selects one of the address signal of the write address counter 63 and the address signal of the read address counter (1) to address the shift memory (1), and an address selector (2) selects one of the address signal of the write address counter 63 and the address signal of the read address counter (2) to address the shift memory (2). A shift register 74 extracts the low order 8 bits, simultaneously of the video data of the CCD 1, and a shift register 76 extracts the high order 8 bits, simultaneously of the video data of the CCD 2. A flip-flop (F/F) 73 is set by a rise of the video enable signal and reset by a ripple carry of the write address counter 63. It controls an input period to the shift register 74. A flip-flop 75 is set by the rise of the video enable signal and reset by a ripple carry of the read address counter (2). It controls an input period to the shift register 76. An I/O port 72 is used by the CPU to read the count of the write address counter 63 when it is counted up. I/O registers 66–69 are used by the CPU to preset data into the write address counter 63 and the read address counters 64 and 65. An I/O register 68 is used by the CPU to designate up-count or down-count to the write address counter 63 and the read address counter 65, to select the count of the address selector 70 or 71, to determine whether the read address counter (2) is driven by the write clock or the read clock, and to control a test signal in the joint mode so that one line of video data is supplied from the CCD driver to the shift memory.

FIG. 10 illustrates image edition of enlarging or reducing a trimmed image at a desired magnification level at a desired reference point. FIG. 10A shows an original image, FIG. 10B shows an enlarged image and FIG. 10C shows a shifted image. A basic technique for image edition is that ① coordinates after edition are calculated based on coordinates of the trimming area, target coordinates and magnification (FIGS. 10A–10C). ② The CPU determines minimum coordinates $x_0$, $y_0$ of the main scan direction coordinates x and the sub-scan direction coordinates y in the trimming area coordinates. Since the coordinates are entered by keying in units of mm and the resolution is 16 lines/mm, the number $L_0$ of lines of the $y_0$ coordinate is $y_0 \times 16$. The information quantity $I_0$ of the $x_0$ coordinate is $x_0 \times 16$ (FIG. 10A). ③ The CPU determines minimum coordinates $x_1$ and $y_1$ of the edited area coordinates (FIG. 10C). ④ A preset value of the read start address of the read address counter for the shift memory is determined based on $x_0$, magnification level and $x_1$. (calculated of address A3 in FIG. 10C). This is explained in detail with reference to FIG. 12-1. (4752×2) bits are provided so that the enlargement by the factor of two is attained in the shift memory. In a single enlargement, the information quantity $I_1$ of the memory is $(x_0 \times magnification \times 16)$ bits. The address $A_1$ of the shift memory for the magnification of the x coordinate is $(A_1 - I_1)$. The address $A_1$ is a start address of the memory and it is stored in the RAM during the joint correction of the CCD. The number $L_2$ of lines of the $y_0$ coordinate for the magnification is ($L_0 \times$ magnification level). The read start address A3 of the shift register is determined to output the enlarged image to $x_1$ from the shift point. It is equal to $A_2 + I_2$, where $I_2$ is the information quantity of the shift coordinate $x_1$, which is equal to $(x_1 \times 16)$. The number $L_1$ of lines of the y coordinate is $y_1 \times 16$.

Then, ⑤ a time period from the generation of the print start (paper feed) signal to the start of the optical system or the generation of the signal VSYNC is determined based on $y_0$, magnification level and $y_1$ (calculation of $L_3$). It is equal to $L_1 - L_2$. When the difference $L_3$ is positive, the start signal or the VSYNC signal is generated ($L_3 \times$ main scan cycle (347.2 μs)) earlier than a reference timing. When $L_3$ is negative, the start signal or the VSYNC signal is generated later. ⑥ A start bit counter and an end bit counter are provided for gating only a portion of the video data in the main scan direction so that the image is outputted to only the edit area. They correspond to 80 and 81 of FIG. 11. They preset count data for the gating through the I/O. A flip-flop 82 is set by the count-up of the counter 80 and reset by the count-up of the counter 81. FIG. 10-G shows an operation thereof. ⑦ The number of lines between changing points in sub-scan direction is calculated based on the coordinates of the trimming area and the magnification level (FIGS. 10D, 10E, 10F). This is effected by counting the video enable signal by the CPU. M indicates the number of lines between the changing points in the sub-scan direction, H indicates the number of bits in the main scan direction, and N indicates the number of lines between the changing points in the sub-scan direction in the enlargement/reduction mode (N=MX magnification level). ⑧ The preset values of the start bit counter and the end bit counter at the changing points of ⑦ are calculated based on the x coordinates after the edition, and they are set as shown in FIG. 10-H.

When no trimming is effected and the entire image is to be outputted, the start bit counter and the end bit counter are used to form a leading edge margin and a separation margin. The initialization step is identical to that described above, but when 36 lines (=2 mm×16 lines) for the leading edge margin were counted, the start bit counter is set to 120 bits (=7.5 mm×16 bits) so that the length corresponding to the separation belt width is blanked.

Figures 1, 12:
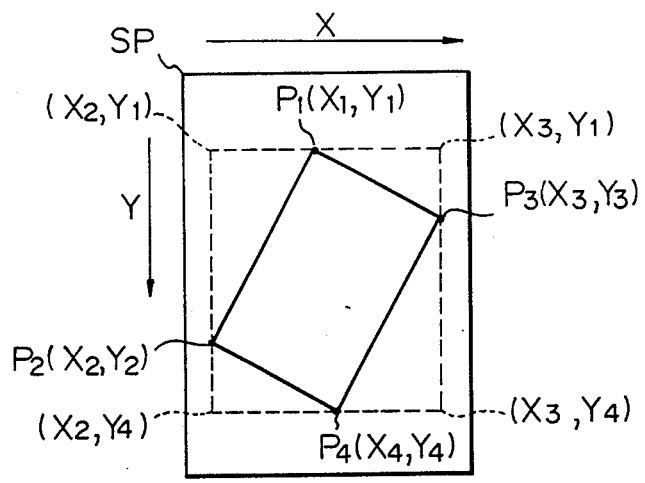
Figures 2, 12:
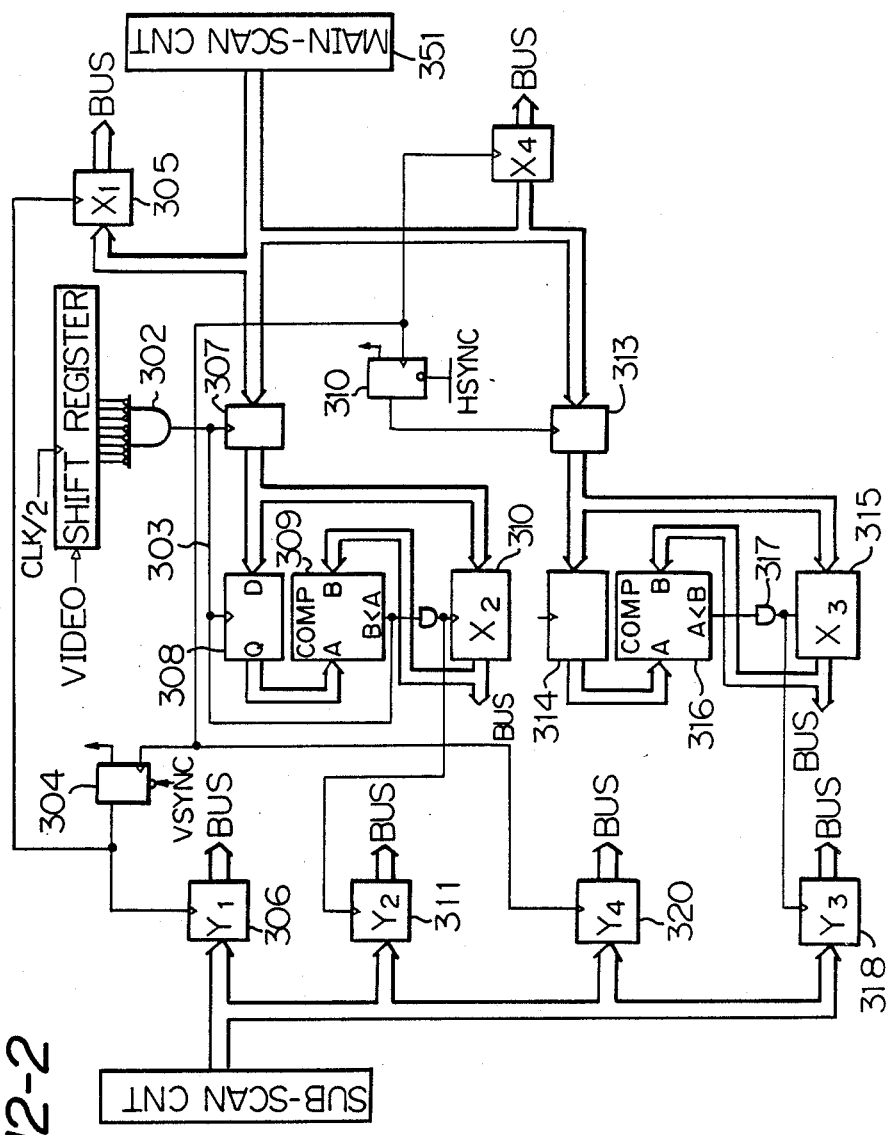
Figures 3, 12:
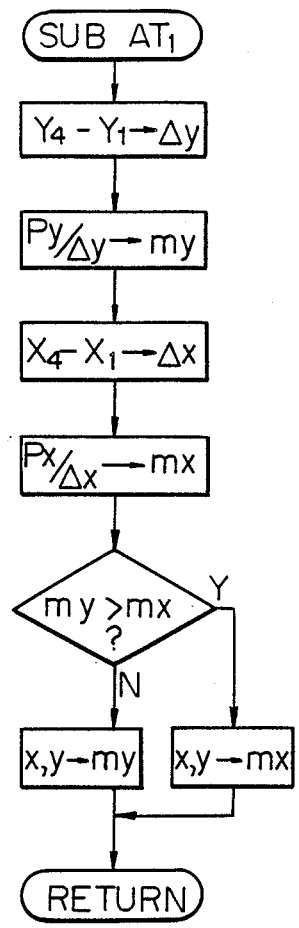
Figures 4, 12:
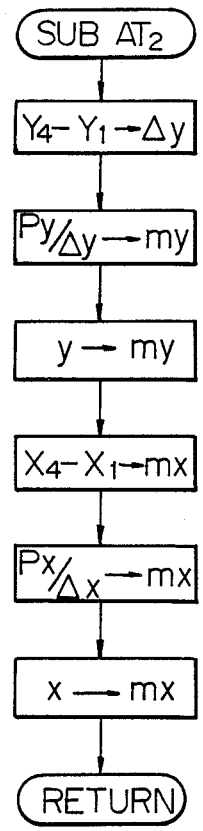

FIG. 12-1 shows an original sheet mounted on the original sheet glass 3 of the reader A. The mount position is basically defined but the original sheet may be mounted obliquely as shown in FIG. 12-1. The optical system is pre-scanned during the pre-rotation cycle of the printer to detect four coordinates $(X_1, Y_1)$, $(X_2, Y_2)$, $(X_3, Y_3)$ and $(X_4, Y_4)$, where X is the main scan direction and Y is the sub-scan direction, and SP is a reference coordinate on the original sheet glass 3. Thus, the size and the position of the original sheet can be determined, and based on the determination, a scanner scan stroke in the multi-copy mode is determined or a desired cassette is selected. The original sheet cover 4 (FIG. 1-2) is mirror-finished so that the image beyond the original sheet area appears black. The pre-scan comprises the main scan and the sub-scan to scan the entire glass area, followed by the scan for printing. The sub-scan velocity is higher than that in the print operation.

FIG. 12-2 shows a circuit for detecting the coordinates. The binarized video data from the pre-scan is supplied to a shift register 301 eight bits at a time. At the end of the 8-bit input, a gate circuit 302 determines if the 8-bit data is all-white data, and if so, it produces a "1" output on a signal line 3. When the first 8-bit white data is detected after the start of the scan of the original sheet, a flip-flop 304 is set. The flip-flop 304 has been reset by the VSYNC (image leading edge signal) It remains set until the next VSYNC appears. When the flip-flop 304 is set, the count of a main scan counter 351 (counter 51 of FIG. 9 of a separate counter) is loaded to a latch flip-flop 305. It is the $x_1$ coordinate. The count of a subscan counter 350 (counter 52 of FIG. 9 or a separate counter) is loaded to a latch 306. It is the $Y_1$ coordinate. Thus, $P_1 (X_1, Y_1)$ is determined.

Each time the "1" signal 303 is produced, the data from the main scan is loaded in a latch 307. This data is stored in a latch 308 immediately (before the next eight bits are supplied to the shift register 301). As the data from the main scan when the first 8-bit white data is detected is loaded into the latch 308, it is compared with a data in latch 310 (which has been reset to "0" by VSYNC) by a comparator 309. If the data in the latch 308 is larger, the data in the latch 308, that is, the data in the latch 307 is loaded into the latch 310. The data of the sub-scan counter is loaded into a latch 311. It is completed before the next eight bits are supplied to the shift register 301. By processing the data of the latch 308 and the latch 310 for the entire image area, the maximum value in the X direction of the image area remains in the latch 310 and the Y coordinate remains in the latch 311. It is $P_2 (X_2, Y_2)$ coordinate.

A flip-flop 312 is set when the first 8-bit white data appears in each main scan line, reset by the horizontal sync signal HSYNC and set by the next 8-bit white data and held set until the next HSYNC. When the flip-flop 312 is set, the count of the main scan counter is loaded to a latch 313 and it is loaded to a latch 314 before the next HSYNC. It is compared with data in a latch 315 by a comparator 316. The latch 315 contains the maximum value in the X direction at the time when the VSYNC was produced. If the data in the latch 315 is larger than the data in the latch 314, a signal 317 is rendered active and the data in the latch 314, that is, the data in the latch 313 is loaded to the latch 315. This operation is carried out in a period between HSYNC and HSYNC. By carrying out the compare operation over the entire image area, the minimum value in the X direction of the original sheet coordinates remains in the latch 315. It is $X_3$. When a signal is produced on a line 317, the data from the sub-scan is loaded in a latch 318. It is $Y_3$.

Each time the 8-bit white data appears in the image area, the counts of the main scan counter and the subscan counter are loaded into latches 319 and 320. Accordingly, at the end of the pre-scan of the original sheet, the count when the 8-bit white data appeared last remains in the counter. It is $(X_4, Y_4)$.

The data lines of those eight latches (6, 11, 20, 18, 5, 10, 15, 19) are connected to the bus line BUS of the CPU so that the CPU reads in those data at the end of the pre-scan. Of those data, the area $X_2, X_3, Y_1$ and $Y_4$ is discriminated as the original sheet area and the trimming is effected during the scan of the original sheet for printing. The coordinates of a broken line rectangle encircling the original sheet positions P1–P4 are identified by the coordinates $X_2, X_3, Y_1$ and $Y_4$ of the original sheet and the size of record sheet therefore can be determined.

In the printer, the paper feed by the regist roller 18 is controlled such that the paper leading edge is registered to the coordinate $Y_1$. In a standard mode, the regist roller 18 is driven by the signal VSYNC (synchronized with the image leading edge sensor 37b) from the reader. As is done for the trimming shift, a time interval corresponding to $Y_1$ is provided between the signal and the signal from the image leading edge sensor 37b. Since the cassette is loaded at a reference position corresponding to the reference position SP of the reader, the image output is shifted by $x_1$ in the main scan direction. This is attained by presetting the read address counter as is done in the trimming shift. The above control modes can be selected by the soft keys or they may be selected by separate input keys.

By entering the auto-command, this area can be enlarged or reduced to fit the size of the cassette sheet. Since the size signal of the selected cassette of the printer is sent to the reader through the S DATA line, the trimming, shifting and enlargement/reduction are sequentially effected in the procedures shown in FIGS. 10-A to 10-L to make a desired copy. In the auto mode, as shown in FIG. 12-3, ratios $m_x$ and $m_y$ of the sizes $\Delta x$ and $\Delta y$ in the X and Y directions of the original sheet to the sizes Px and Py of the cassette sheet are determined. A smaller one of the ratios is stored in the RAM as a common ratio for the X and Y direction, and the enlargement/reduction is effected. Thus, the auto enlargement/reduction copy is made while using one of the directions of
the sheet as a reference. In the auto 2 mode, as shown in FIG. 12-4, ratios of the sizes in the X and Y directions of the original sheet to the sizes in the X and Y directions of the sheet are determined and the magnifications in the X and Y directions are independently set. Accordingly, the original image can be copied on the entire area of the sheet. The auto 1 and auto 2 modes can be effected in the auto enlargement/reduction mode with trimming coordinate designated.

FIG. 10-L shows a flow chart of the procedures of the trimming, enlargement/reduction and shifting. In FIG. 10-J, when the shifting is involved, the processing for $x_0$ and $y_0$ is first effected. When the shifting is not involved, the start bit counter and the end bit counter of FIG. 11 are sequentially controlled by $x_0', y_0' \rightarrow x_5, y_5$ as shown in FIG. 10-K so that the area other than the trimming area is rendered white. Because the trimming area is an area encircled by lines, an area which is to be divided into rectangular areas in the Y direction is designated by designating two diagonal points by the x and y coordinates. It may be divided into three areas. The units of division are in mm.

Namely, the processing $(x_0y_0; x_1y_1)+(x_2y_2; x_3y_3)+(x_4y_4; x_5y_5)$ is sequentially effected. In the manual shift mode and the auto mode, the coordinates are translated and the video output is controlled.

In FIG. 11, numerals 90 and 91 denote exclusive OR gate for defining the image area and OF is a control signal therefor. When OF is "1", an area within a frame defined by an ST counter and an EN counter is masked and an area outside of the frame is outputted, and when OF is "0", the area within the frame is outputted and the area outside of the frame is masked. Numeral 92 denotes an AND gate for controlling the outputting of the image data, numeral 93 denotes an AND gate which determines whether the mask is to be outputted as black or white, and BB is a control signal therefor. When it is "1", the mask is black and when it is "0" the mask is white. Numeral 95 denotes and OR gate for outputting the image outputs from the gates 92 and 93 as the video signal, numeral 94 denotes an exclusive OR gate which controls white-black reversal of the image data, and IN is a control signal therefor. When it is "1", the original image is gated and when it is "0" it is reversed. Those signals are outputted by the CPU when it detects the inputs of masking, white, black and negative by the soft keys.

When the mask signal is "1", as Q of the flip-flop 82 is rendered "1" by the count-up of the ST counter, the output of the gate 90 is rendered "0" and the gate 92 produces no output until the EN counter counts up, that is, until Q is rendered "0". Namely, it is masked. Since the output of the gate 91 is "1" during this period, the gate 93 is "1" when the black/white signal BB is "1", and the image output gate 95 continues to output "1". Namely, it is masked. On the other hand, when OF is "1" and BB is "0", it is white-masked. When OF is "0", the outputs of the gates 90 and 91 are "1" and "0", respectively, and when BB is "1", the area outside of the trimming area is black, and when OFF is "0" and BB is "0", the area outside of the trimming area is white.

Figures 1, 13:
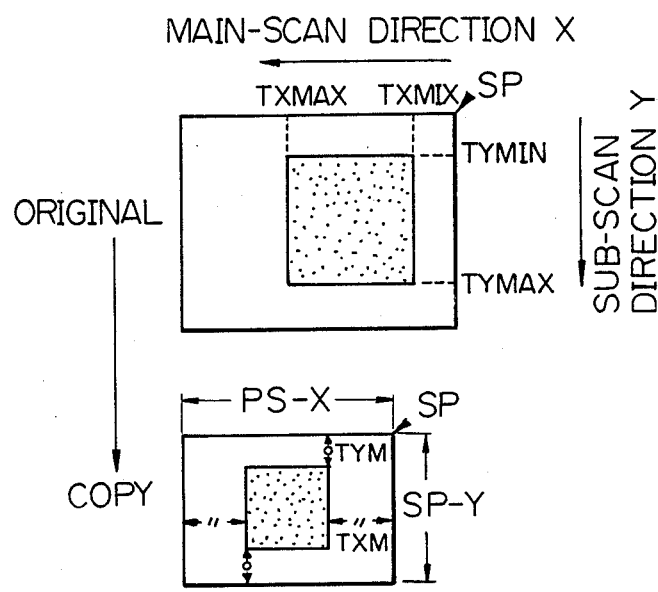

FIGS. 13-1 and 13-2 illustrate printing (centering) of a small original image or a trimmed area of the original image at a center of the sheet, and a control flow of the CPU therefor. Maximum value and minimum value (TXMAX, TYMAX),(TXMIN, TYMIN) of the trimming area (hatched area) are set (1). They may be set by detecting the coordinates. The magnifications in the X and Y directions which fit the sheet are determined. They are defined as MX and MY by a subroutine auto AT2 technique (2). The MX and MY may be determined by the ten-key keypad to select desired magnifications in the X and Y directions or they may be determined by a subroutine AT1. The lengths PS-X and PS-Y of the sheet in the X direction and the Y direction are set in the RAM. They are determined by the data from the printer (3). The move distances TXM and TYM for the centering are determined based on those data (4). The X direction distance TXM is obtained by subtracting the magnified length of the trimming width in the X direction from the sheet length and dividing the difference by two. The Y direction distance TYM is obtained in a similar manner. Only when the TXM and TYM are positive, the operation is valid, and if it is negative, a warning is issued. Then, the procedures shown in FIGS. 10-A to 10-K are followed.

A book mode and a mode for preparing divisional tables from a parent table, which utilize the above technique, are explained.

Figures 2A, 14:
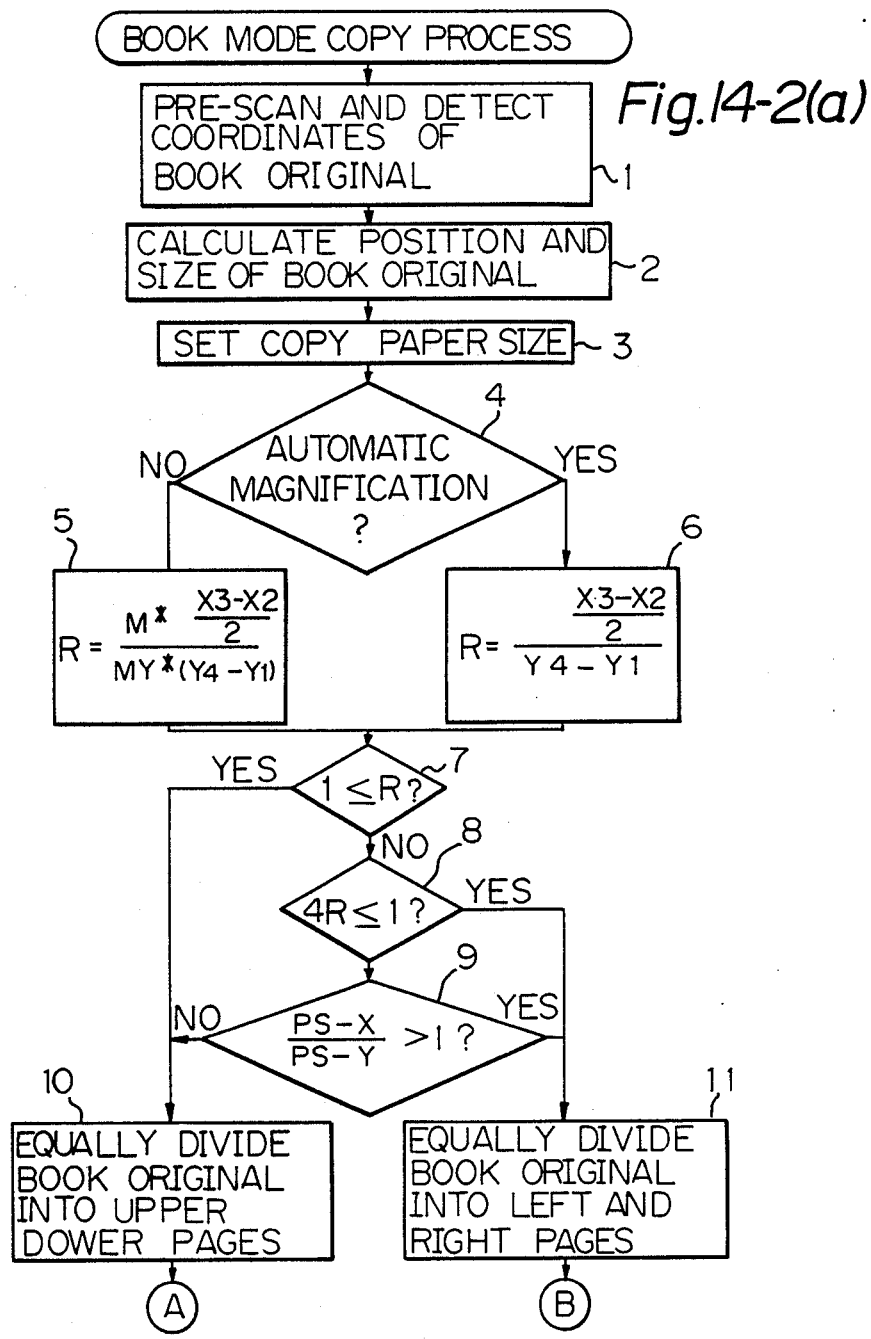
Figures 1, 2B, 14:
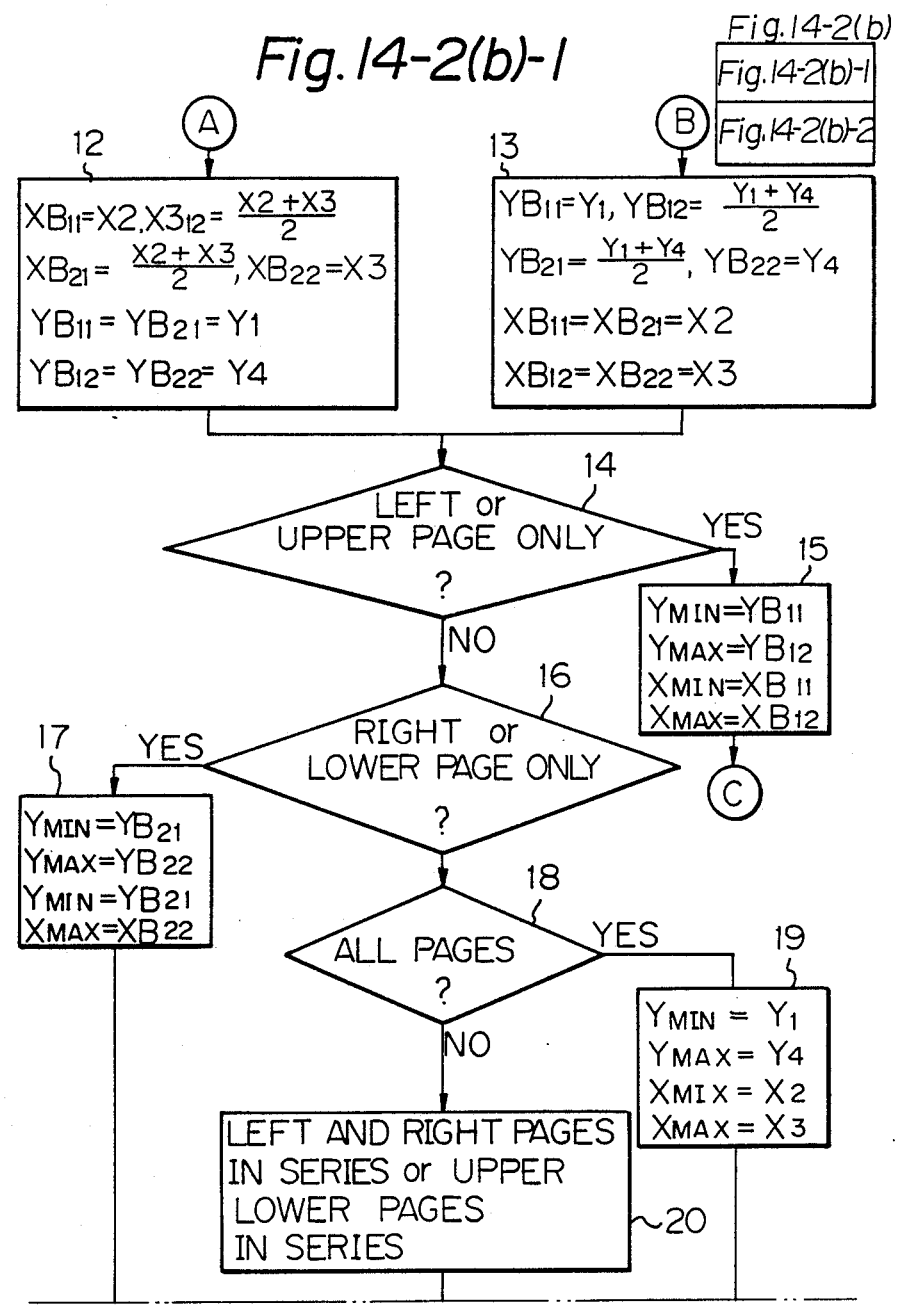
Figures 2, 2B, 14:
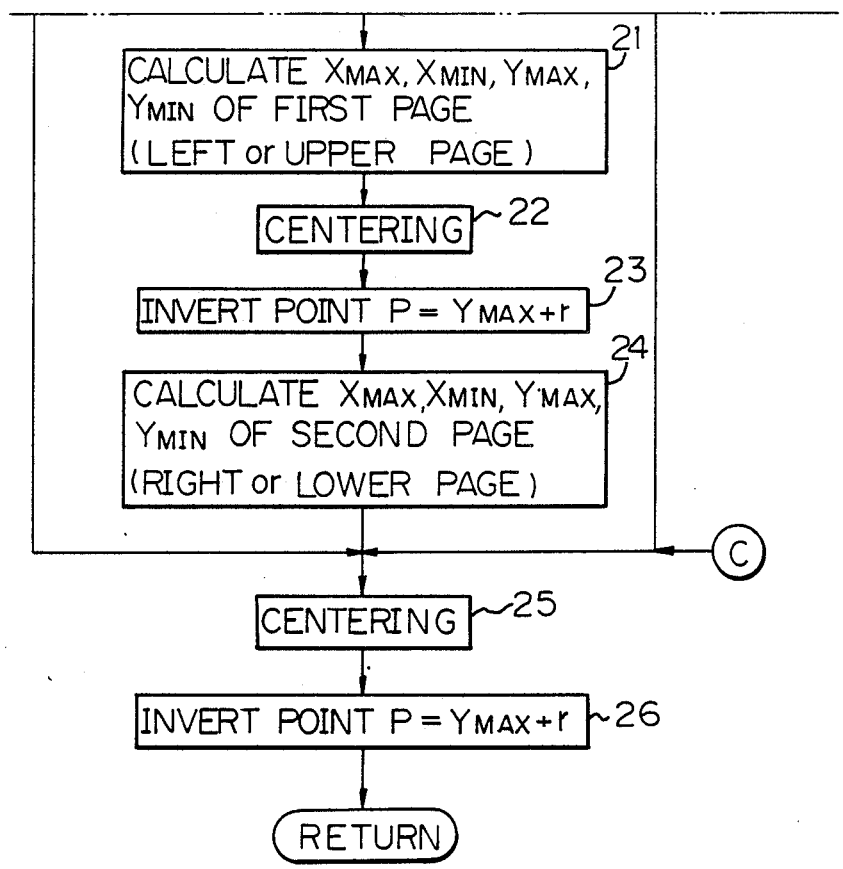

FIGS. 14-1–14-3 illustrate the book mode in which left and right pages or upper and lower pages of a hook-type original sheet mounted at any desired position and in any orientation on the platen 3 are independently or continuously read and printed into one or two sheets, and a control flow therefor. A center seam of the book-type original sheet mounted on the platen is parallel to the sub-scan direction as shown by a broken line in FIG. 14-1(a) or parallel to the main scan direction as shown by a broken line in FIG. 14-1(b), depending on the orientation of the original sheet. In FIG. 14-1(a), the upper area of the broken line (seam) is called an upper page and the lower area is called a lower page, and in FIG. 14-1(b), the left area of the broken line (seam) is called a left page and the right area is called a right page.

The book-mode can be divided into seven sub-modes.

(a) print only the left page
(b) print only the right page
(c) print the left and right pages on separate sheets
(d) print only the upper page
(e) print only the lower page
(f) print the upper and lower pages on separate sheets
(g) print the left and right pages or the upper and lower pages on one sheet.

The seven sub-modes are displayed in abbreviation on the display 202 and can be selected by the soft key 201. The display/selection method may be (1) display and select (a)–(g) as separate modes, or (2) display and select (a) and (d), (b) and (e), and (c) and (f) as common modes (or (a) and (e), (b) and (d), and (c) and (f) as common modes).

As shown in FIG. 14-2, whether the mode display/selection method is (1) or (2), the pre-scan is effected to detect the coordinates of the original sheet (step 1) if the copy start key is depressed after the mode setting, the position (x2, y1) of the book-type original sheet and the size (X3-X2, Y4-Y1) are calculated (step 2), and the copy paper size PS-x, PS-y is set (step 3). When the mode selection method is (1), the following steps are carried out depending on the modes (a)–(g) immediately after the position and the size of the book-type original sheet are determined.

When the mode selection method is (2), the orientation of the mounted original sheet is checked to determine whether it is oriented as shown in FIG. 14-1(a) or FIG. 14-1(b) and then the following steps (steps 12–26) are carried out.

(a) In the "print only the left page" mode, XMIN of the trimming coordinates is set to XZ, XMAX is set to X3, YMIN is set to y1 and YMAX is set to the Y coordinate at the center of the book ((y1+y4)×0.5) (steps 13 and 15), and the centering is effected (step 25). The reversal position P of the optical system is set to YMAX+γ (step 26). Those data are stored in the RAM. Based on the coordinate thus determined, the left half image of the book-type original sheet of FIG. 14-1(b) can be printed at the center of the copy sheet. (b) In the "print only the right page" mode, XMIN and XMAX are set in the same manner as (a) above (step 13), YMIN is set to the Y coordinate at the center of the book ((y1+y4)×0.5) and YMAX is set to Y4 (Step 17). Then, the centering is effected (step 25) and the optical system reversal point P is determined (step 26). (c) In the "print left and right pages on separate sheets" mode (step 20), the steps in (a) and (b) are sequentially carried out to set the data. The data of the first page is set in steps 21–23 and the data of the second page are set in steps 24–26 so that two cycles of data are stored.

(d) In the "print only the upper page" mode, the trimming coordinate YMIN is set to y1, YMAX is set to y4, XMIN is set to X2 and XMAX is set to the center of the book (( y2+x3)×0.5) (steps 12 and 15), and the centering (step 25) is effected. The optical system reversal point P is set to YMAX+γ (step 26) and those data are set in the RAM. Based on the coordinates thus obtained, the upper-half image above the seam of FIG. 14-1(a) is printed at the center of the copy sheet.

(e) In the "print only the lower page" mode, the trimming coordinates XMIN and YMAX are set in the same manner as (d), XMIN is set to the seam of the book ((x2+x3)×0.5) and XMAX is set to X3 (steps 12 and 17), the centering is effected (step 25) and the optical system reversal point Pis set in the same manner as (d) (step 26).

(f) In the "print the upper and lower pages on separate sheets" mode, the steps in (d) and (e) are sequentially carried out to set the data. The data of the first page is set in steps 21-23 and the data of the second page are set in steps 24-26 so that two cycles of data are stored.

(g) In the "print the left and right pages or the upper and lower pages on one sheet" mode, YMIN is set to y1, YMAX is set to y4, XMIN is set to X2 and XMAX is set to X3 (step 19), the centering is effected (step 25) and the optical system reversal point P is set to YMAX+γ (step 26). Those data are set in the RAM. After the setting of the data necessary for printing into the RAM, the scan is effected to print the image.

In the scan cycle, the address counters are preset and the scanner sequence is controlled in accordance with the data preset in the RAM. In the mode (c) where the book-type original sheet is mounted as shown in FIG. 14-1(b) and two pages are to be printed continuously, the preset values of the read address counter which controls the readout of the video data from the shift memory, the start bit counter and the end bit counter are the same in the first scan for printing the left page and the second scan for printing the right page, but the optical system reversal point is $$\frac{Y1 + Y4}{2} + \gamma$$

in the first scan and Y4+γ in the second scan.

On the other hand, in the mode (f) in which the upper and lower pages of the book-type original sheet mounted as shown in FIG. 14-1(a) are printed continuously, the optical system reversal point is Y4+γ in the first scan and the second scan but the preset values of the counters are different in the first scan and the second scan.

The above operation can be carried out both in the auto-magnification mode and in the manual magnification mode and the area other than the effective image area of the original sheet can be rendered either white or black. In those modes, the start timing of the scanner or the regist timing of the paper feed in the printer may be retarded or advanced in accordance with the information such as centering information to reproduce the image at a proper position. The Y coordinate of the original sheet may be manually entered by the ten-key keypad or the size key. For the main scan direction, only the centering is effected by the X coordinate determined by the automatic detection and the key input. In this manner, the right and left pages or the upper and lower pages of the book can be printed on real time at proper magnifications without moving the book so that the copy operation is greatly facilitated. Since the image is printed at the center of the copy sheet and unnecessary information can be blocked, a high quality of copy is obtained. The print operation can be started before the end of the read operation by the reader and the copy speed is very high in spite of the edition.

Referring to FIG. 14-1, the automatic detection of the mount orientation of the book-type original sheet in the mode selection method (2) is explained. The length of the selected sheet in the main scan direction is PS-X and the length in the sub-scan direction is PS-Y (see FIG. 13-1). The length of the book-type original sheet is divided by two in the sub-scan direction to determine the upper or lower page length $$\left(\frac{X3 - X2}{2}, Y4 - Y1\right),$$

and divided by two in the main scan direction to determine the left or right page length $$\left(X3 - X2, \frac{Y4 - Y1}{2}\right).$$

A ratio R of longitudinal and lateral lengths of the magnified upper/lower page is determined $$\left(R = \frac{MX \times \frac{(X3 - X2)}{2}}{MY \times (Y4 - Y1)}\right)$$

and a similar ratio for the left/right page is determined $$\left(\frac{MX \times (X3 - X2)}{MY \times \frac{(Y4 - Y1)}{2}}\right).$$

The latter is equal to 4R. There are three relationships.
(I) 1≦R<4R, (II) R≦1≦4R, and (III) R<4R≦1 (In the auto-magnification mode, MX/MY=1). On the other hand, for PS-X/PS-Y (see FIG. 13-1), $$\frac{PS - x}{PS - y} > 1 \text{ or (2)} \frac{PS - x}{PS - y} < 1. \left(\frac{PS - x}{PS - y} = 1\right) \quad (1)$$

does not occur in a normal size sheet).

By the correlation of the conditions (I), (II), (III), (1) and (2), it is determined whether the book-type original sheet on the platen is oriented as shown in FIG. 14-1(a) or FIG. 14-1(b). A result is shown in FIG. 14-3 (steps 7, 8, 9, 10, 11).

When (I) 1≦R<4R, even if R=1, 4R=4. It is largely different from the longitudinal/lateral length ratio of the normal size sheet and is not practical. Accordingly, it is determined as the upper/lower page. When (III) R<4R≦1, even if 4R=1, R=0.25. Accordingly, it is determined as the left/right pages for the same reason.

When (II) R≦1≦4R, it is determined as the left/right pages if $$\frac{PS - x}{PS - y} > 1,$$

and as the upper/lower pages if $$\frac{PS - x}{PS - y} < 1.$$

It is an intention to output the longitudinal direction of the original sheet in the longitudinal direction of the copy sheet, and the lateral direction in the lateral direction.

The above determination is based on the size of the sheet selected by the operator. A method of comparing the automatically detected length (X3−X2) of the book-type original sheet with (Y4−Y1) and divide the longer length by two is simple and effective to normal document (types A, B and letter) and also effective in the automatic selection mode of the sheet.

A specific example of the above method is explained. Assuming that left and right pages of a book of 150 mm×105 mm size in a closed state is to be separately printed on size A4 sheets, if only the laterally mounted size A4 cassette is available in the printer, the operator may mount the book on the platen with the seam being parallel to the main scan direction, set the mode and depress the copy start button. Since the automatically detected size is X3−X2≈150 mm and Y4−Y1≈210 mm, R≈0.36 and 4R=1.43 in the unity magnification mode or auto-magnification mode.

When the size A4 sheet is laterally fed, PS−X=297 mm and PS−Y=210 mm and hence PS−x/PS−y=1.41. Accordingly, the left/right page mode is determined in accordance with FIG. 14-3 and a desired print is obtained. When the unity magnification is selected, the image is printed at the center of the copy sheet by the centering and no circumferential black frame appears. In the auto-magnification mode, the image is enlarged by a factor of 200% so that the image is printed on the entire area of the size A4 sheet.

If only the size A4 longitudinal-feed cassette is available in the printer, the operator may mount the book at any position on the platen with the seam being parallel to the sub-scan direction Thus, R=0.7, 4R=2.8, PS−x/PS−y=0.7 and it is determined as the upper-/lower page mode and a desired print is obtained.

Figures 1, 15:
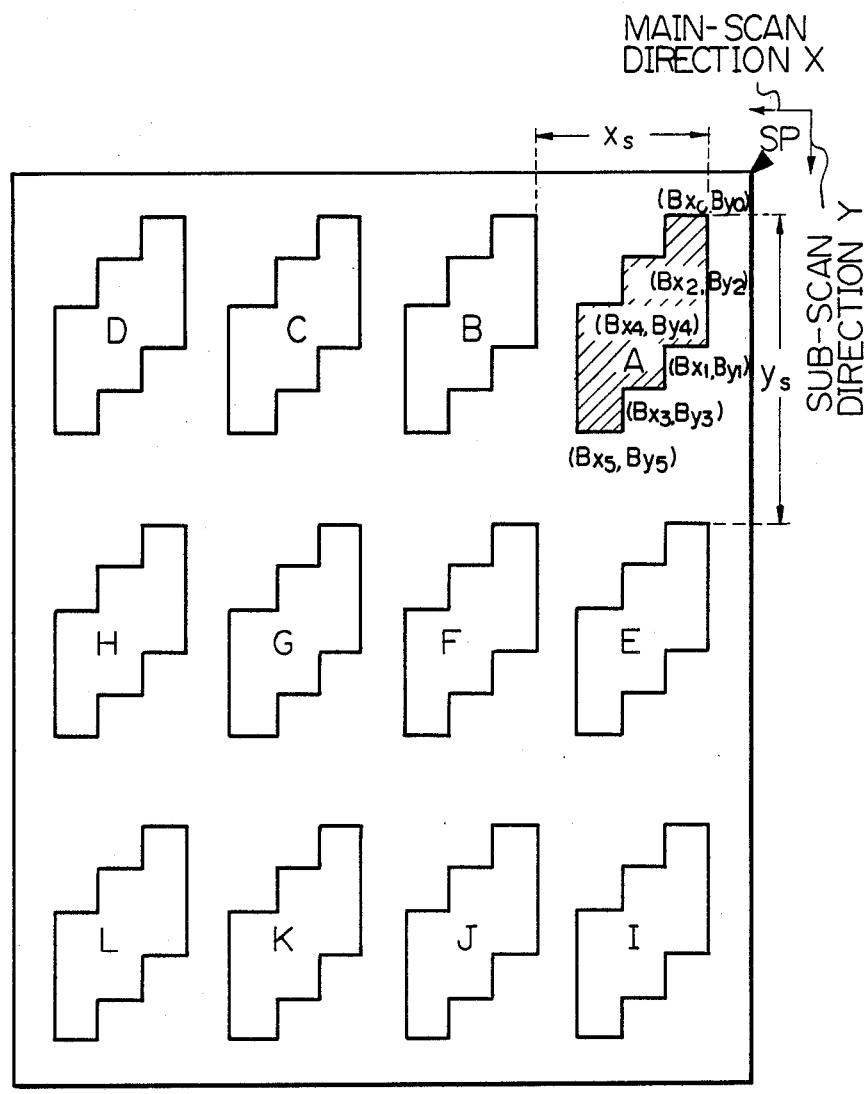
Figure 16B:
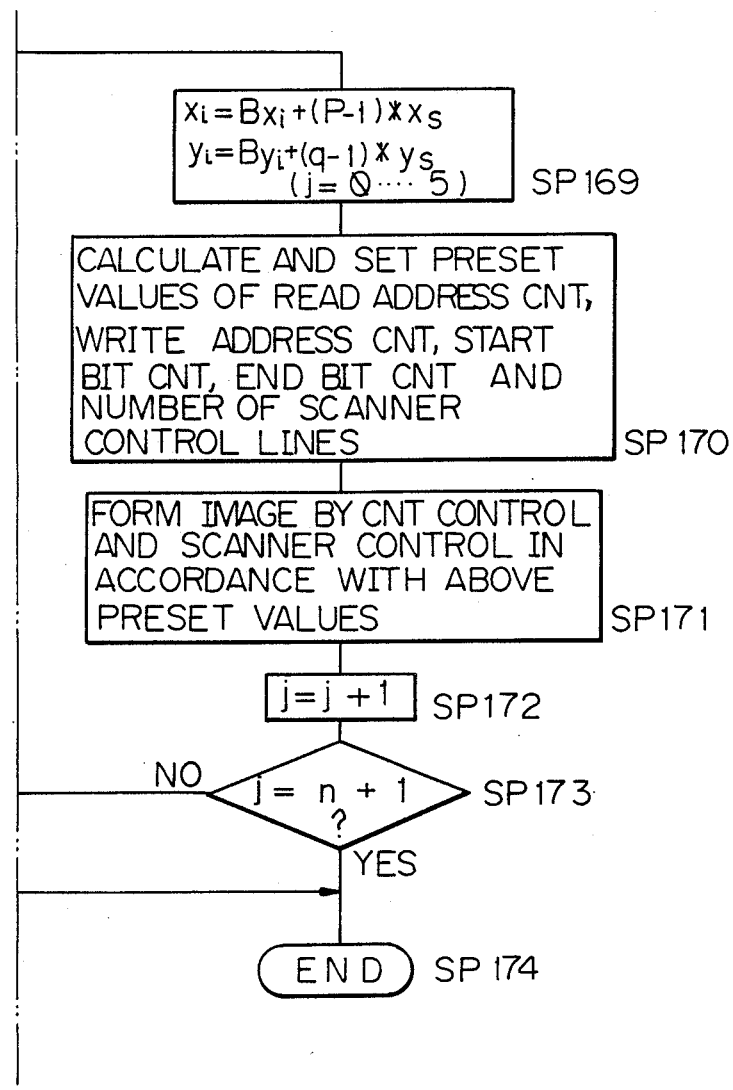

The preparation of divisional lists by using the above method is described. In the divisional list preparation mode, a specified plural number of divisional lists are printed, by trimming, on separate sheets at the same position in a specified sequence as shown in FIG. 15-2 from a parent list which includes divisional lists of the same format arranged in an orderly fashion as shown in FIG. 15-1, by a single output command.

Reference are made to FIGS. 15-1, 15-2, 15-3 and 16.

The operator enters reference trimming points $B_{xi}$, $B_{yi}$ (i=0, . . . 5) from the console panel (SP 160). As shown in FIG. 15-1, the reference trimming points are the trimming points of a divisional list (A) to be trimmed which is closest to SP (origin point of the original sheet). In the divisional list A of FIG. 15-1, three areas are specified although two or one area may be specified.

Next, trimming point reference offset values $x_s$ and $y_s$ are entered from the console panel (SP 161). As shown in FIG. 15-1, the trimming point reference offset values indicate differences between corresponding trimming points of adjacent divisional lists, for example, A and B or A and E of regularly spaced divisional lists. They are given by the main scan direction distance $x_s$ and the sub-scan direction distance $y_s$.

The trimming points of all divisional lists can be calculated from $B_{xi}$, $B_{yi}$, $x_s$ and $y_s$. For example, the trimming point of the divisional list L is given by $x_i = B_{x\text{-}i} + 3 \cdot x_s$, $y_i = B_{yi} + 2 \cdot y_s$ (i=0, . . . 5).

The types of the divisional lists to be outputted and the output sequence are then entered by the console panel (SP 162). As shown in FIG. 15-2, the divisional lists can be designated by representing them as matrix elements. The reference divisional list A is always represented by (1, 1) and the divisional list L is represented by (4, 3). Pairs of data representing the elements are stored in areas $SEQX_j$ and $SEQY_j$ of the RAM in the execution sequence, wherein j is a suffix to represent the order of execution. For example, $SEQX_j$ is a j-th value in an area SEQX on the RAM having (n+1) bytes, where n may be an appropriate number sufficient to execute.

A specific example is described. For example, in FIG. 15-2, if the divisional lists F, K, D, I, C are to be trimmed and outputted in this order, they are represented by the matrix elements as (2, 2), (3, 3), (4, 1), (1, 3), (3, 1) and stored in the SEQX and the SEQY as shown below.

| j | 0 | 1 | 2 | 3 | 4 | 5 | 6 | 7 | ... | n−1 | n |
|---|---|---|---|---|---|---|---|---|-----|-----|---|
| SEQX | 2 | 3 | 4 | 1 | 3 | 0 | 0 | 0 | | 0 | 0 |
| SEQY | 2 | 3 | 1 | 3 | 1 | 0 | 0 | 0 | | 0 | 0 |

Then, target points TXM and TYM to which the divisional list trimmed from the parent list is to be outputted on an output form as shown in FIG. 15-3 are entered from the console panel (SP 163). The target points need not be directly designated but an automatic calculation mode may be selected, as is done in the centering operation. The movement was described above and hence the explanation is omitted here. Then, magnifications mx, my are entered from the console panel (SP 164). Again, they need not be directly entered but selected one of two automagnification modes described above may be used.

The settings by the operator have thus been completed, and the machine waits for the depression of the copy start key (SP 165).

When the copy start key is depressed, j is set to 0 (SP 166) so that the above sequence is executed from the first step. The matrix elements of the divisional list for j are read from the areas SEQX and SEQY and are set in areas p and q on the RAM (p=$SEQX_j$, q=$SEQY_j$) When j=0, p=2 and q=2 as seen from the table (SP 167). It is determined if both p and q are not zero (SP 168). If they are zero, it indicates that the output request by the operator has been executed, and the processing is terminated (SP 168, SP 174). This is apparent from j=5 column of the table. Accordingly, when the SEQX and SEQY are set (SP 162), it is necessary to clear all of non-designated $SEQX_j$ and $SEQY_j$ to zero.

As the elements p and q which designate the divisional list for the execution sequence j are determined, the trimming points of the divisional list are calculated in accordance with $$x_i = B_{xi} + (p-1) \cdot x_s$$

$$y_i = B_{yi} + (q-1) \cdot y_s \text{(SP 169)}$$

when j=0, $$x_i = B_{xi} + (2-1) \cdot x_s$$

$$y_i = B_{yi} + (2-1) \cdot y_s$$

These are the trimming points of the divisional list to be first outputted, as is seen from FIG. 15-1.

Based on the calculated $x_i$ and $y_i$ (i=0, . . . 5) and TXM, TYM, mx and my, the preset values of the address counters for controlling the image in the main scan direction are calculated and set in the RAM, and the preset values for moving the optical system in the sub-scan direction and controlling the image output are calculated and set in the RAM (SP 170). Then, the scan by the optical system is started to form a required number of images, the optical system is stopped at a home position and the processing for the divisional list is terminated (SP 171).

Then, j is incremented by one (SP 172) to calculate the trimming points of the next divisional list. When j reaches n+1, all processings are terminated (SP 173, SP 174). If j has not yet reached n+1, the process returns to SP 167 and the matrix elements p and q for designating the divisional list to be next processed are read from the SEQX and SEQY and the above sequence is repeated. In this manner, the designated divisional lists are trimmed in the designated sequence.

In the above example, the divisional lists are arranged both in the main scan direction and in the sub-scan direction. If the $SEQX_j$ is fixed to 1 and only the $SEQY_j$ is varied, a parent list having divisional lists arranged in the sub-scan direction can be handled in a simpler manner, and if the $SEQY_j$ is fitted to 1 and only the $SEQX_j$ is varied, a parent list having divisional lists arranged in the main scan direction can be handled in a simpler manner, as will be seen from FIG. 15-2. In this case, only one of the reference offset values $x_s$ and $y_s$ may be set and the other may be fixed.

Areas defined by dividing the original sheet area by two in the main scan direction and the sub-scan direction, respectively, can be randomly outputted by the same means.

While the trimming was shown in the above example, any portion of each divisional list of FIG. 15-1 can be masked in a desired sequence and outputted by one output request, by using the same means.

Since the trimmed divisional list can be outputted at any position on the copy sheet, form overlay can be simply attained by setting formatted copy sheets in a cassette.

What is claimed is:

1. An image processing system comprising:
   image input means for reading image information;
   data input means for inputting data relative to a plurality of image areas containing the image information, wherein said data input means includes indicating means for indicating the order in which the image information should be output;
   instructing means for providing a start instruction signal to initiate image processing; and
   control means for controlling said image input means such that input processing by said image input means is executed the same number of times as the number of the plurality of image areas corresponding to said input data, in response to a start instruction signal from said instructing means,
   wherein said control means controls said image input means such that only one image area is input for each input processing.

2. An image processing system according to claim 1, further comprising printing means for outputting the image information input by each of the input processings on a single sheet of recording medium.

3. An image processing system according to claim 2, wherein the data includes data for defining an output position, on said sheet when the image information is to be outputted.

4. An image processing system according to claim 1, wherein said data input means is adapted to input data for defining the size of the image area.

5. An image processing system according to claim 1, wherein said data input means is adapted to input data for defining the number of the image areas.

6. An image processing system according to claim 1, wherein the data includes the size of at least one image area and a distance between two image areas.

7. An image processing system according to claim 1, wherein the plurality of image areas may be of any form.

8. An image processing system according to claim 1, wherein said control means controls said image input means such that the image information except for the desired image information is masked in each of the input processings.

9. An image processing system according to claim 1, wherein the data includes data for defining an order of the plurality of the image areas to be input.

10. An image processing system according to claim 1, wherein said image input means includes a movable scanner.

11. An image processing system according to claim 1, wherein said control means includes logic gates.

12. An image processing system comprising:
    a platen for placing a book-like original thereon;
    scanning means for scanning the original placed on said platen for image processing;
    information generating means for generating information indicating whether the book-like original is positioned on said platen with its pages in either a longitudinal orientation or in a latitudinal orientation with respect to said platen;
    recognizing means for recognizing the position of the book-like original by scanning the book-like original placed on said platen; and
    control means for determining whether image information to be obtained by said scanning means corresponds to the book-like original placed with a longitudinal orientation or with a latitudinal orientation, in response to the position recognized by said recognizing means and the information generated by said information generating means.

13. An image processing system according to claim 12, wherein said information generating means recognizes whether the book-like original is placed on said platen with a longitudinal orientation or a latitudinal orientation, in response to the image information obtained by the scanning operation in order to generate a recognizing signal.

14. An image processing system according to claim 13, wherein said information generating means recognizes whether the book-like original is placed with a longitudinal orientation or with a latitudinal orientation.

15. An image processing system according to claim 12, further comprising indicating means for indicating whether the image information to be obtained corresponds to one page or both pages of the book-like original when placed so as to have a latitudinal orientation.

16. An image processing system according to claim 12, further comprising indicating means for indicating whether the image information to be obtained corresponds to one page or both pages of the book-like original when placed so as to have a longitudinal orientation.

17. An image processing system according to claim 12, further comprising printing means for printing information corresponding to one page of the original at a desired position on one sheet of a recording medium.

18. An image processing system according to claim 12, wherein said control means includes logic gates.

19. An image processing system according to claim 12, wherein said scanner means includes a movable scanner.

20. An image processing system comprising:
a platen for placing an original thereon;
scanning means for scanning the original placed on said platen for image processing;
recognizing means for recognizing a position of the original in response to the scanning operation of said scanning means;
generating means for generating information for defining a plurality of areas, which are of a desired shape, of the image information on said original;
output means for outputting image information obtained by one scanning operation of said scanning means; and
control means for each controlling said output means such that the image information, corresponding to a different one of the plurality of said areas on said original, is output on one sheet of a recording medium by said output means by means of a plurality of repeated scanning operations of said scanning means, in response to the position information obtained by said recognizing means and the information obtained by said generating means.

21. An image processing system according to claim 20, wherein said generating means generates coordinate information for indicating the shapes of the plurality of areas.

22. An image processing system according to claim 20, further comprising position designating means for designating a position on said one sheet where the image information is output by said output means.

23. An image processing system according to claim 20, further comprising designating means for designating an order of said image information, to be output, corresponding to the plurality of said areas.

24. An image processing system according to claim 20, wherein said scanning means includes a movable scanner.

25. An image processing system according to claim 20, wherein said control means includes logic gates.

26. An image processing system comprising:
a platen for placing an original thereon;
input means for inputting image information by scanning the original placed on said platen for image processing;
readout means for reading out said image information input by said input means;
converting means for converting the image information, for one line, input by said input means into digital data;
mode designating means for designating one of two modes in the case of the original placed with pages in a main scanning direction of said input means, wherein in one mode only information on an upper page is output and in the other mode only information on a lower page is output;
control means for causing said input means to perform one scanning operation in order to obtain both of image information of one line on said upper page and image information of one line on said lower page, regardless of the designation of said mode designating means, wherein said control means controls said read out means such that said read out means reads out either said image information of one line on said upper page or said image information of one line on said lower page; and
output means for outputting said image information either on the upper or the lower page on one sheet in response to the image information read by said control means.

27. An image processing system according to claim 26, wherein said input means includes a movable scanner.

28. An image processing system according to claim 26, wherein the platen is adapted to receive a book-like original.

29. An image processing system according to claim 26, wherein said control means includes logic gates.

30. An image processing system according to claim 26, wherein said upper page and said lower page are adjacent to each other in the main scanning direction.

31. An image processing system according to claim 26, wherein said output means outputs image information of said upper page or said lower page onto an output medium with a desired magnification.

32. An image processing system according to claim 26, wherein said output means outputs image information on said upper page or lower page at a desired position on an output medium.

33. An image processing system comprising:
a platen for placing an original thereon;
scanning means for scanning the original placed on said platen for image processing;
recognizing means for recognizing a size of the original in response to the scanning operation of said scanning means;
output means for outputting image information obtained by the scanning operation of said scanning means;
mode switching means for switching between a first mode in which two documents different from each other are read out from an original, and are output, and a second mode in which a single document is read out from the original, and is output; and
control means for controlling said output means such that when the first mode is selected by a switching operation of said mode switching means, the image information obtained by the scanning operation is divided into two sets of image information in response to the size recognized by said recognizing means and each of the two sets of image information is output on a different sheet, the size of which is equal to the size of a corresponding one of the two sets of image information.

34. An image processing system according to claim 33, wherein said control means controls said output means such that when the second mode is selected by a switching operation of said mode switching means, said image information obtained by the scanning operation of said scanning means is output on a single paper the size of which corresponds to the size recognized by said recognizing means.

35. An image processing system according to claim 33, wherein said output means includes a plurality of cassettes each for storing a paper with a different size and a select means for selecting a cassette which is one among said plurality of said cassettes and which stores a paper with the size recognized by said recognizing means or a paper with half of the size recognized by said recognizing means.

36. An image processing system according to claim 33, wherein said mode switching means includes a display for displaying a variety of information relative to image processing and a data input means for inputting data in response to information displayed by said display.

37. An image processing system according to claim 33, wherein said control means controls said output means such that when the first mode is selected by a switching operation of said mode switching means, the two divided sets of image information are output at the center of the paper.

38. An image processing system according to claim 33, wherein said scanner means includes a movable scanner.

39. An image processing system according to claim 33, wherein said control means includes logic gates.

40. An image processing system comprising:
a platen for placing an original thereon;
scanning means for scanning the original placed on said platen for image processing;
recognizing means for recognizing a size of the original in response to the scanning operation of said scanning means;
output means for outputting image information obtained by the scanning operation of said scanning means;
mode selecting means for selecting one from among a first mode in which two documents different from each other are scanned by said scanning means and are output, and a second mode in which a single document is scanned by said scanning means and is output; and
control means for controlling said output means such that when the first mode is selected by a selecting operation of said mode selecting means, the image information obtained by the scanning operation is divided into two sets of image information in response to the size recognized by said recognizing means and at least one of the two sets of image information is output on a different sheet, the size of which is equal to the size of a corresponding one of the two sets of image information.

41. An image processing system according to claim 40, wherein said control means controls said output means such that when the second mode is selected by a selecting operation of said mode selecting means, said image information obtained by the scanning operation of said scanning means is output on a single paper the size of which corresponds to the size recognized by said recognizing means.

42. An image processing system according to claim 40, wherein said output means includes a plurality of cassettes each for storing a paper with a different size and a select means for selecting a cassette which is one among said plurality of said cassettes and which stores a paper with the size recognized by said recognizing means or a paper with half of the size recognized by said recognizing means.

43. An image processing system according to claim 40, wherein said mode selecting means includes a display for displaying a variety of information relative to image processing and a data input means for inputting data in response to information displayed by said display.

44. An image processing system according to claim 40, wherein said control means controls said output means such that when the first mode is selected by a selecting operation of said mode selecting means, the two divided sets of image information are output at the center of the paper.

45. An image processing system according to claim 40, wherein said scanner means includes a movable scanner.

46. An image processing system according to claim 40, wherein said control means includes logic gates.

* * * * *